US012687195B2

(12) United States Patent (10) Patent No.: US 12,687,195 B2

Imura (45) Date of Patent: Jul. 21, 2026

(54) SLIDING PARTS

(71) Applicant: EAGLE INDUSTRY CO., LTD., Tokyo (JP)

(72) Inventor: Tadatsugu Imura, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 48 days.

(21) Appl. No.: 18/685,161

(22) PCT Filed: Aug. 24, 2022

(86) PCT No.: PCT/JP2022/031862

§ 371 (c)(1),
(2) Date: Feb. 20, 2024

(87) PCT Pub. No.: WO2023/027102

PCT Pub. Date: Mar. 2, 2023

(65) Prior Publication Data

US 2024/0344555 A1 Oct. 17, 2024

(30) Foreign Application Priority Data

Aug. 26, 2021 (JP) ................................. 2021-138020

(51) Int. Cl.
F16C 17/02 (2006.01)

(52) U.S. Cl.
CPC .................................. F16C 17/026 (2013.01)

(58) Field of Classification Search
CPC ...... F16C 17/026; F16C 17/00; F16C 33/107; F16C 2240/42; F16C 17/045
See application file for complete search history.

(56) References Cited

U.S. PATENT DOCUMENTS

| | | | |
|---|---|---|---|
| 1,876,515 A | 9/1932 | Emmet et al. | |
| 2,244,450 A | 6/1941 | Erni | |
| 3,380,040 A * | 4/1968 | Liggett | ................. F16C 17/045 |
| | | | 384/100 |

(Continued)

FOREIGN PATENT DOCUMENTS

| | | | |
|---|---|---|---|
| CN | 1245552 | 2/2000 | ............... F16J 15/34 |
| CN | 1401924 | 3/2003 | ............... F16J 15/16 |

(Continued)

OTHER PUBLICATIONS

U.S. Appl. No. 18/685,139, filed Feb. 20, 2024, Yamaguchi et al.

(Continued)

*Primary Examiner* — Eugene G Byrd

(74) *Attorney, Agent, or Firm* — HAYES SOLOWAY P.C.

(57) ABSTRACT

In sliding parts which is disposed at a relative rotational location of a rotating machine, and in which a first dynamic pressure generation groove extending so as to be inclined with respect to a relative rotation direction and a second dynamic pressure generation groove extending so as to be inclined in a direction opposite to the inclination direction of the first dynamic pressure generation groove with respect to the relative rotation direction in a plan view are provided on a sliding surface, bottom surfaces of the first dynamic pressure generation groove and the second dynamic pressure generation groove are inclined in the same direction with respect to a radial direction in a cross-sectional view.

16 Claims, 15 Drawing Sheets

(56) References Cited

U.S. PATENT DOCUMENTS

| | | | |
|---|---|---|---|
| 3,383,116 A | 5/1968 | Carter | 277/96 |
| 3,527,465 A | 9/1970 | Guinard | |
| 3,675,935 A | 7/1972 | Ludwig | F16J 15/342 |
| 3,695,789 A | 10/1972 | Jansson | F01C 21/003 |
| 3,704,019 A | 11/1972 | McHugh | 277/400 |
| 3,782,737 A | 1/1974 | Ludwig et al. | 277/27 |
| 3,855,624 A * | 12/1974 | Reinhoudt | F16C 17/045 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,201,531 A * | 4/1993 | Lai | F16J 15/3412 |
| | | | 277/400 |
| 5,224,714 A | 7/1993 | Kimura | 277/400 |
| 5,316,455 A | 5/1994 | Yoshimura | F04C 29/0021 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A * | 11/2000 | Wang | F16J 15/3412 |
| | | | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,062,775 B2 | 6/2015 | Short et al. | |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,666 B2 | 2/2017 | Ferris | F16J 15/3412 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,053,975 B2 | 7/2021 | Imura | F16C 17/045 |
| 11,125,335 B2 | 9/2021 | Kimura et al. | |
| 11,248,706 B2 | 2/2022 | Imura | F16C 33/74 |
| 11,320,052 B2 | 5/2022 | Imura et al. | F16J 15/34 |
| 11,821,521 B2 | 11/2023 | Imura et al. | |
| 11,913,454 B2 | 2/2024 | Suzuki | F04C 29/00 |
| 12,000,488 B2 | 6/2024 | Lang et al. | |
| 2002/0014743 A1 | 2/2002 | Zheng | F16J 15/34 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0135957 A1 | 6/2005 | Park | F04C 18/0215 |
| 2005/0212217 A1 | 9/2005 | Tejima | 277/399 |

| | | | |
|---|---|---|---|
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0194966 A1 | 8/2011 | Takeuchi | F04B 18/0215 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1* | 8/2012 | Hosoe | F16J 15/342 |
| | | | 277/400 |
| 2012/0280458 A1* | 11/2012 | Artiles | F16J 15/342 |
| | | | 277/411 |
| 2013/0168928 A1 | 7/2013 | Schrufer | C10M 103/02 |
| 2013/0209011 A1 | 8/2013 | Tokunaga | |
| 2013/0323105 A1 | 12/2013 | Chao et al. | F04C 29/028 |
| 2014/0159314 A1 | 6/2014 | Hosoe | F16J 15/34 |
| 2014/0197600 A1 | 7/2014 | Hosoe | F16J 15/342 |
| 2014/0217676 A1* | 8/2014 | Hosoe | F16J 15/40 |
| | | | 277/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0184752 A1 | 7/2015 | Itadani | F16J 15/3412 |
| 2015/0345641 A1* | 12/2015 | Lattin | F16J 15/3412 |
| | | | 277/401 |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0089467 A1 | 3/2017 | Young | F01D 11/003 |
| 2017/0146014 A1 | 5/2017 | Ohta et al. | F04C 29/0021 |
| 2017/0241549 A1 | 8/2017 | Itadani | F16J 15/3412 |
| 2017/0261107 A1 | 9/2017 | Martin | F16J 15/3452 |
| 2017/0350407 A1* | 12/2017 | Yamamoto | F16C 33/1045 |
| 2018/0017163 A1 | 1/2018 | Hosoe et al. | F16J 15/164 |
| 2018/0073394 A1 | 3/2018 | Tokunaga et al. | F01D 25/18 |
| 2018/0106157 A1 | 4/2018 | Kovacik et al. | F01D 11/01 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0169988 A1 | 6/2019 | Tokunaga et al. | F01C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2019/0376558 A1 | 12/2019 | Kimura et al. | |
| 2020/0141444 A1 | 5/2020 | Thatte | F16C 17/08 |
| 2020/0224722 A1 | 7/2020 | Imura | F16C 33/743 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0116032 A1 | 4/2021 | Kimura | F16J 15/188 |
| 2021/0364034 A1 | 11/2021 | Okada | F16J 15/342 |
| 2022/0056949 A1 | 2/2022 | Ikeda et al. | F16C 17/04 |
| 2022/0196152 A1 | 6/2022 | Imura | |
| 2023/0027772 A1 | 1/2023 | Suzuki et al. | F16C 17/02 |
| 2023/0258182 A1 | 8/2023 | Suzuki | F04B 18/0215 |

FOREIGN PATENT DOCUMENTS

| | | | |
|---|---|---|---|
| CN | 101644333 | 2/2010 | F16J 15/34 |
| CN | 201496542 | 6/2010 | F16J 15/16 |
| CN | 101793324 | 8/2010 | F16J 15/16 |

(56)  References Cited

FOREIGN PATENT DOCUMENTS

| | | | |
|---|---|---|---|
| CN | 203098871 | 7/2013 | .............. F16J 15/34 |
| CN | 103557229 | 2/2014 | .............. F16C 17/04 |
| CN | 103557334 | 2/2014 | .............. F16J 15/34 |
| CN | 203641506 | 6/2014 | .............. F16J 15/16 |
| CN | 205244387 | 5/2016 | .............. F16J 15/16 |
| CN | 205877184 | 1/2017 | .............. F16J 15/16 |
| CN | 205877198 | 1/2017 | .............. F16J 15/34 |
| CN | 106439023 | 2/2017 | .............. F16J 15/16 |
| CN | 107489770 | 12/2017 | .............. F16J 15/34 |
| CN | 109237042 | 1/2019 | .............. F16J 15/34 |
| CN | 110925426 | 3/2020 | .............. F16J 15/16 |
| CN | 111306302 | 6/2020 | ........... F16J 15/328 |
| CN | 210800068 U | 6/2020 | |
| CN | 213899890 U | 8/2021 | |
| DE | 102008038396 | 2/2010 | |
| DE | 102020203764 A1 * | 9/2021 | ......... F16C 33/1065 |
| EP | 0369295 | 11/1988 | .............. F16J 15/34 |
| EP | 0518681 | 12/1992 | ........... G11B 15/60 |
| EP | 0637706 | 8/1993 | .............. F16J 15/34 |
| EP | 2138225 | 12/2009 | ............. B01J 13/20 |
| EP | 2754931 | 7/2014 | .............. F16J 15/34 |
| EP | 3112078 | 1/2017 | ......... B23K 26/364 |
| EP | 3196516 | 7/2017 | .............. F16J 15/34 |
| EP | 3217049 | 9/2017 | .............. F16J 15/34 |
| EP | 3396186 | 10/2018 | ............. F16C 33/10 |
| EP | 3575621 | 12/2019 | ............. F16C 33/10 |
| EP | 3575643 | 12/2019 | .............. F16J 15/34 |
| EP | 3650722 | 5/2020 | ............. F16C 33/12 |
| FR | 2342440 | 9/1997 | .............. F16J 15/34 |
| GB | 1509482 | 5/1978 | ............. F16C 33/10 |
| GB | 2263952 | 8/1993 | .............. F16J 15/34 |
| JP | S51-034974 | 3/1976 | |
| JP | S52-143571 | 10/1977 | .............. F16J 15/26 |
| JP | 57163770 | 10/1982 | ......... F16J 15/3412 |
| JP | H05-99344 | 4/1983 | .............. F16J 15/34 |
| JP | S59-195253 | 12/1984 | .............. F16J 15/34 |
| JP | S59-195254 | 12/1984 | .............. F16J 15/34 |
| JP | S59-231269 | 12/1984 | .............. F16J 15/34 |
| JP | S59231268 | 12/1984 | |
| JP | S61-8402 | 1/1986 | .............. F01C 1/01 |
| JP | S61-82177 | 5/1986 | .............. F16J 15/34 |
| JP | S62-31775 | 2/1987 | .............. F16J 15/34 |
| JP | S63-134883 | 6/1988 | ............. F04C 18/02 |
| JP | H02-16381 | 1/1990 | ............. F04C 18/02 |
| JP | H02-236067 | 9/1990 | .............. F16J 15/34 |
| JP | H02-136863 | 11/1990 | .............. F16J 15/34 |
| JP | H04-50559 | 2/1992 | .............. F16J 15/34 |
| JP | H04-337165 | 11/1992 | .............. F16J 15/34 |
| JP | H04-362289 | 12/1992 | ............. F04C 18/02 |
| JP | H05-60247 | 3/1993 | .............. F16J 15/34 |
| JP | H05-296248 | 11/1993 | |
| JP | H06-117547 | 4/1994 | .............. F16J 15/34 |
| JP | H06-174107 | 6/1994 | .............. F16J 15/34 |
| JP | H06-105105 | 12/1994 | .............. F16J 15/34 |
| JP | H07-43038 | 5/1995 | .............. F16J 15/34 |
| JP | H08-296745 A2 | 11/1996 | |
| JP | 9-89119 | 3/1997 | .............. F16J 15/34 |
| JP | H09228968 | 9/1997 | .............. F01C 17/06 |
| JP | 9-292034 | 11/1997 | .............. F16J 15/34 |
| JP | H10-281299 | 10/1998 | .............. F16J 15/34 |
| JP | H10-292867 | 11/1998 | |
| JP | H10-339286 | 12/1998 | ............. F04C 18/02 |
| JP | H11-132163 | 5/1999 | ............. F04C 18/02 |
| JP | H11-287329 | 10/1999 | .............. F16J 15/34 |
| JP | H11-303858 | 11/1999 | ............. F16C 17/10 |
| JP | 3066367 | 5/2000 | .............. F16J 15/34 |
| JP | 2001-12458 | 1/2001 | ............. F16C 17/10 |
| JP | 2003-343730 | 12/2003 | .............. F16J 15/22 |
| JP | 2004-360903 | 12/2004 | ........... F16J 15/447 |
| JP | 2005-155894 | 6/2005 | ............. F16C 17/04 |
| JP | 2005-180652 | 7/2005 | .............. F16J 15/34 |
| JP | 2005-315391 | 11/2005 | |
| JP | 2006-9614 | 1/2006 | ............. F04C 18/08 |
| JP | 2006-77899 | 3/2006 | .............. F16J 15/34 |
| JP | 2006-90524 | 4/2006 | ............. F16C 17/02 |
| JP | 2006-183702 | 7/2006 | ............. F16C 17/04 |
| JP | 2006-316677 | 11/2006 | ............. F04C 18/02 |
| JP | 2007-162045 | 6/2007 | |
| JP | 2007-263374 | 10/2007 | .............. F16J 15/34 |
| JP | 2011-74931 | 4/2011 | .............. F16J 15/34 |
| JP | 2012-2295 | 1/2012 | .............. F16J 15/34 |
| JP | 2012-062534 | 3/2012 | |
| JP | 2012-82794 | 4/2012 | ............. F04C 18/02 |
| JP | 2012-122135 | 6/2012 | ........... C25D 15/02 |
| JP | 2013-167216 | 8/2013 | ............. F04C 18/02 |
| JP | 2013-213545 | 10/2013 | ............. F16C 32/06 |
| JP | 2014-529052 | 10/2014 | |
| JP | 2015-063647 | 4/2015 | |
| JP | 2015-68330 | 4/2015 | ............. F04C 29/00 |
| JP | 5693599 | 4/2015 | |
| JP | 2015-183631 | 10/2015 | .............. F04C 2/10 |
| JP | 2016-80090 | 5/2016 | .............. F16J 15/34 |
| WO | WO2013053411 | 4/2013 | |
| WO | WO2014061544 | 4/2014 | |
| WO | WO2018139231 | 8/2018 | .............. F16J 15/34 |
| WO | WO2018139232 | 8/2018 | ............. F16C 33/10 |
| WO | WO2020032086 | 2/2020 | .............. F16J 15/34 |
| WO | WO-2020209258 A1 * | 10/2020 | ........... F16C 33/741 |

OTHER PUBLICATIONS

U.S. Appl. No. 18/685,144, filed Feb. 20, 2024, Tsukamoto et al.
International Search Report, Written Opinion and International Preliminary Report on Patentability issued in PCT/JP2022/028961, dated Sep. 6, 2022, with English translation, 20 pages.
International Search Report, Written Opinion and International Preliminary Report on Patentability issued in PCT/JP2022/028963, dated Oct. 11, 2022, with English translation, 24 pages.
International Search Report, Written Opinion and International Preliminary Report on Patentability issued in PCT/JP2022/031862, dated Sep. 9, 2022, with English translation, 20 pages.

* cited by examiner

ROTATION DIRECTION
OF MATING SEAL RING

A-A CROSS-SECTIONAL VIEW

B-B CROSS-SECTIONAL VIEW

ROTATION DIRECTION
OF MATING SEAL RING

910

SLIDING PARTS

TECHNICAL FIELD

The present invention relates to sliding parts, for example, sliding parts which are used for a shaft seal or a bearing.

BACKGROUND ART

As sliding parts that prevent a leakage of a sealed fluid around a rotating shaft of a rotating machine, for example, there is known a mechanical seal including a pair of sliding rings having an annular shape which rotate relative to each other and of which sliding surfaces slide against each other. In such a mechanical seal, in recent years, there has been a demand for reducing sliding-induced energy loss for environmental measures and the like, and positive pressure generation grooves may be provided on a sliding surface of a sliding ring.

For example, in a mechanical seal as illustrated in Patent Citation 1, a plurality of dynamic pressure generation mechanisms are provided on a sliding surface of one sliding ring in a circumferential direction. Each of the dynamic pressure generation mechanisms includes a first dynamic pressure generation groove which is inclined and extends with respect to a relative rotation direction and of which both ends are closed, and a second dynamic pressure generation groove which is inclined and extends in a direction opposite to the first dynamic pressure generation groove with respect to the relative rotation direction and of which both ends are closed. The first dynamic pressure generation groove and the second dynamic pressure generation groove are disposed side by side in a radial direction on the sliding surface, in detail, the first dynamic pressure generation groove is disposed on a radially outer side (sealed fluid side), and the second dynamic pressure generation groove is disposed on a radially inner side (leakage side). In addition, each of the first dynamic pressure generation groove and the second dynamic pressure generation groove has a constant depth over the entirety of the groove.

During relative rotation of sliding rings, a sealed fluid existing inside the first dynamic pressure generation groove moves toward an end portion on a downstream side of the relative rotation (radially inner side), and the sealed fluid concentrates on the end portion to generate a positive pressure, so that the sliding surfaces are separated from each other, and a fluid film of the sealed fluid is formed between the sliding surfaces. Therefore, lubricity is improved and low friction is realized. On the other hand, in the second dynamic pressure generation groove, since a relative negative pressure is generated in the vicinity of an end portion on an upstream side of the relative rotation (radially inner side), and the sealed fluid that has flowed into a gap between the sliding surfaces is suctioned into the second dynamic pressure generation groove, a leakage of the sealed fluid to the leakage side space can be reduced.

CITATION LIST

Patent Literature

Patent Citation 1: JP 2005-180652 A (Pages 5 and 6, FIG. 1)

SUMMARY OF INVENTION

Technical Problem

In the mechanical seal of Patent Citation 1, for the relative rotation in the direction described above, positive pressures are easily increased on the downstream side of the relative rotation of the first dynamic pressure generation groove and the second dynamic pressure generation groove, and the sealed fluid is collected at the center of the sliding surface in the radial direction to form a fluid film, so that lubricity is enhanced. However, in the mechanical seal as disclosed in Patent Citation 1, since relative rotation in a reverse direction is not taken into consideration, for the relative rotation in the reverse direction, positive pressures are not increased on the downstream side of the relative rotation of the first dynamic pressure generation groove and the second dynamic pressure generation groove, unlike during the relative rotation in the forward direction, and the sliding surfaces are not separated from each other, which is a problem.

The present invention has been made in view of such a problem, and an object of the present invention is to provide sliding parts in which sliding surfaces separate from each other for relative rotation in both directions and which has excellent lubricity.

Solution to Problem

In order to solve the foregoing problem, according to the present invention, there are provided sliding parts which are disposed at a relative rotational location of a rotating machine, comprising a first sliding component having a first sliding surface and a second sliding component having a second sliding surface relatively slidable with the first sliding surface, the first sliding surface or the second sliding surface being provided with a first dynamic pressure generation groove extending so as to be inclined with respect to a relative rotation direction in a plan view, the first sliding surface or the second sliding surface being provided with a second dynamic pressure generation groove extending so as to be inclined in a direction opposite to an inclination direction of the first dynamic pressure generation groove with respect to the relative rotation direction in the plan view, wherein a bottom surface of the first dynamic pressure generation groove is equal, in inclination direction with respect to a radial direction, to a bottom surface of the second dynamic pressure generation groove in a cross-sectional view. According to the aforesaid features of the present invention, the first dynamic pressure generation groove becomes shallower toward an end portion on a downstream side of the relative rotation. The second dynamic pressure generation groove becomes deeper toward an end portion on the downstream side of the relative rotation. Accordingly, for relative rotation in a forward direction, a positive pressure is likely to be generated in the first dynamic pressure generation groove, and a negative pressure is less likely to be generated in the second dynamic pressure generation groove. On the other hand, for relative rotation in a reverse direction, a negative pressure is less likely to be generated in the first dynamic pressure generation groove, and a positive pressure is likely to be generated in the second dynamic pressure generation groove. For this reason, for the relative rotations in both directions, positive pressures are reliably generated in the entirety of the first and second dynamic pressure generation grooves, to separate the first and second sliding surfaces from each other, so that the sliding parts have excellent lubricity.

It may be preferable that an end portion on a deep side of the first dynamic pressure generation groove communicates with a sealed fluid side space or a leakage side space. According to this preferable configuration, for the relative rotation in the forward direction, since a sealed fluid or a fluid on the leakage side is easily supplied into the first dynamic pressure generation groove, the positive pressure is easily increased. In addition, for the relative rotation in the reverse direction, since the fluid is easily discharged from inside the first dynamic pressure generation groove to the sealed fluid side space or the leakage side space, a negative pressure is less likely to be generated.

It may be preferable that the second dynamic pressure generation groove is a closed groove, and a length of the second dynamic pressure generation groove in an inclination direction of the second dynamic pressure generation groove is longer than a length of the first dynamic pressure generation groove in an inclination direction of the first dynamic pressure generation groove. According to this preferable configuration, for the relative rotation in the reverse direction, the positive pressure generation capability of the second dynamic pressure generation groove not communicating with both the sealed fluid side space and the leakage side space is enhanced. For this reason, for the relative rotations in both directions, positive pressures of the same degree are generated by the first and second dynamic pressure generation grooves.

It may be preferable that the first dynamic pressure generation groove and the second dynamic pressure generation groove communicate with each other. According to this preferable configuration, the supply of the fluid between the first dynamic pressure generation groove and the second dynamic pressure generation groove is easily performed.

It may be preferable that the first dynamic pressure generation groove and the second dynamic pressure generation groove are disposed side by side in the radial direction. According to this preferable configuration, since dynamic pressures having different magnitudes in the radial direction are generated on the sliding surfaces, the dynamic pressures are likely to be evenly generated in a circumferential direction of the sliding surfaces.

It may be preferable that both the first dynamic pressure generation groove and the second dynamic pressure generation groove are provided on one of the first sliding surface and the second sliding surface. According to this preferable configuration, the balance of the dynamic pressures generated in the entirety of the first and second dynamic pressure generation grooves is easily adjusted.

DESCRIPTION OF EMBODIMENTS

Figure 1:
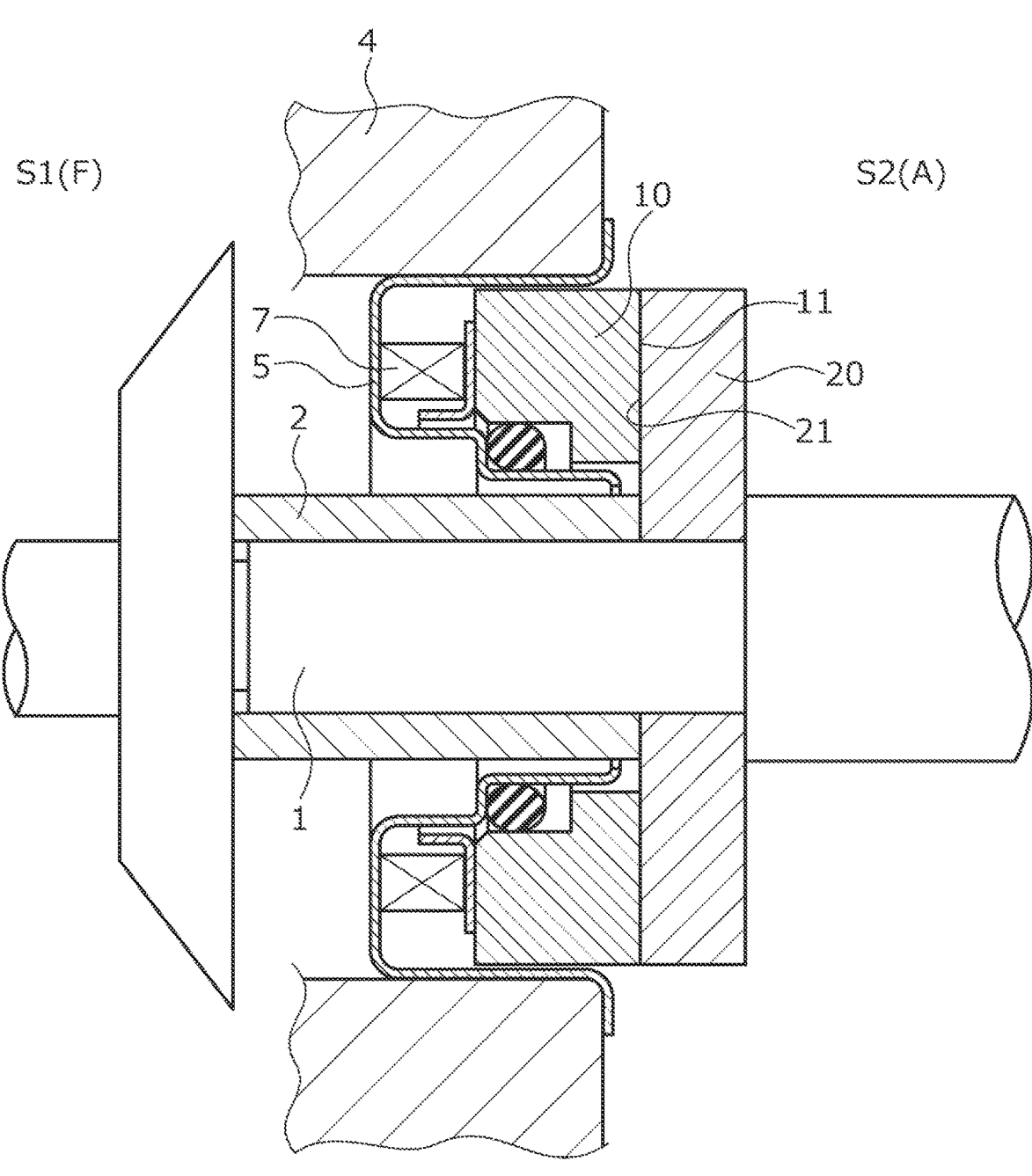
FIG. 1 is a longitudinal sectional view illustrating one example of a mechanical seal as sliding parts according to a first embodiment of the present invention.

Modes for implementing sliding parts according to the present invention will be described below based on embodiments.

First Embodiment

A mechanical seal as sliding parts according to a first embodiment of the present invention will be described with reference to FIGS. 1 to 6. Incidentally, in the present embodiment, a description will be made based on the fact that a sealed fluid F exists in an inner space S1 of the mechanical seal, atmosphere A exists in an outer space S2, a radially inner side of sliding rings forming the mechanical seal is a sealed fluid side (high-pressure side), and a radially outer side is a leakage side (low-pressure side). In addition, for convenience of description, in the drawings, a gradation indicating shallowness and depth may be added to grooves or the like formed on a sliding surface.

A mechanical seal for an automobile illustrated in FIG. 1 is an outside mechanical seal that seals the sealed fluid F in the inner space S1 which tends to leak from the radially inner side toward the radially outer side of sliding surfaces, and that allows the outer space S2 to communicate with the atmosphere A. Incidentally, in the present embodiment, a mode in which the sealed fluid F is a high-pressure gas and the atmosphere A is a gas having lower pressure than the sealed fluid F will be provided as an example.

The mechanical seal mainly includes a rotating seal ring 20 as one of a first sliding component and a second sliding component, and a stationary seal ring 10 as the other of the first sliding component and the second sliding component. The rotating seal ring 20 has an annular shape, and is provided on a rotating shaft 1 so as to be rotatable together with the rotating shaft 1 via a sleeve 2. The stationary seal ring 10 has an annular shape, and is provided on a seal cover 5 fixed to a housing 4 of an attached device, so as to be non-rotatable and movable in an axial direction. The stationary seal ring 10 is biased in the axial direction by an elastic member 7, so that a sliding surface 11 of the stationary seal ring 10 and a sliding surface 21 of the rotating seal ring 20 come into close contact with and slide against each other. Incidentally, the sliding surface 21 of the rotating seal ring 20 is a flat surface, and a recessed portion such as a groove is not provided on the flat surface.

The stationary seal ring 10 and the rotating seal ring 20 are typically made of SiC (as an example of hard material) or a combination of SiC and carbon (as an example of soft material); however, the present invention is not limited to these materials, and any sliding material that is used as a sliding material for mechanical seals can be applied. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN, and as carbon, mixed carbon of a carbonaceous substance and a graphitic substance, resin-molded carbon, sintered carbon, and the like can be used. In addition, in addition to the above-described sliding materials, metal materials, resin materials, surface modification materials (e.g., coating materials), composite materials, and the like can also be applied.

Figure 2:
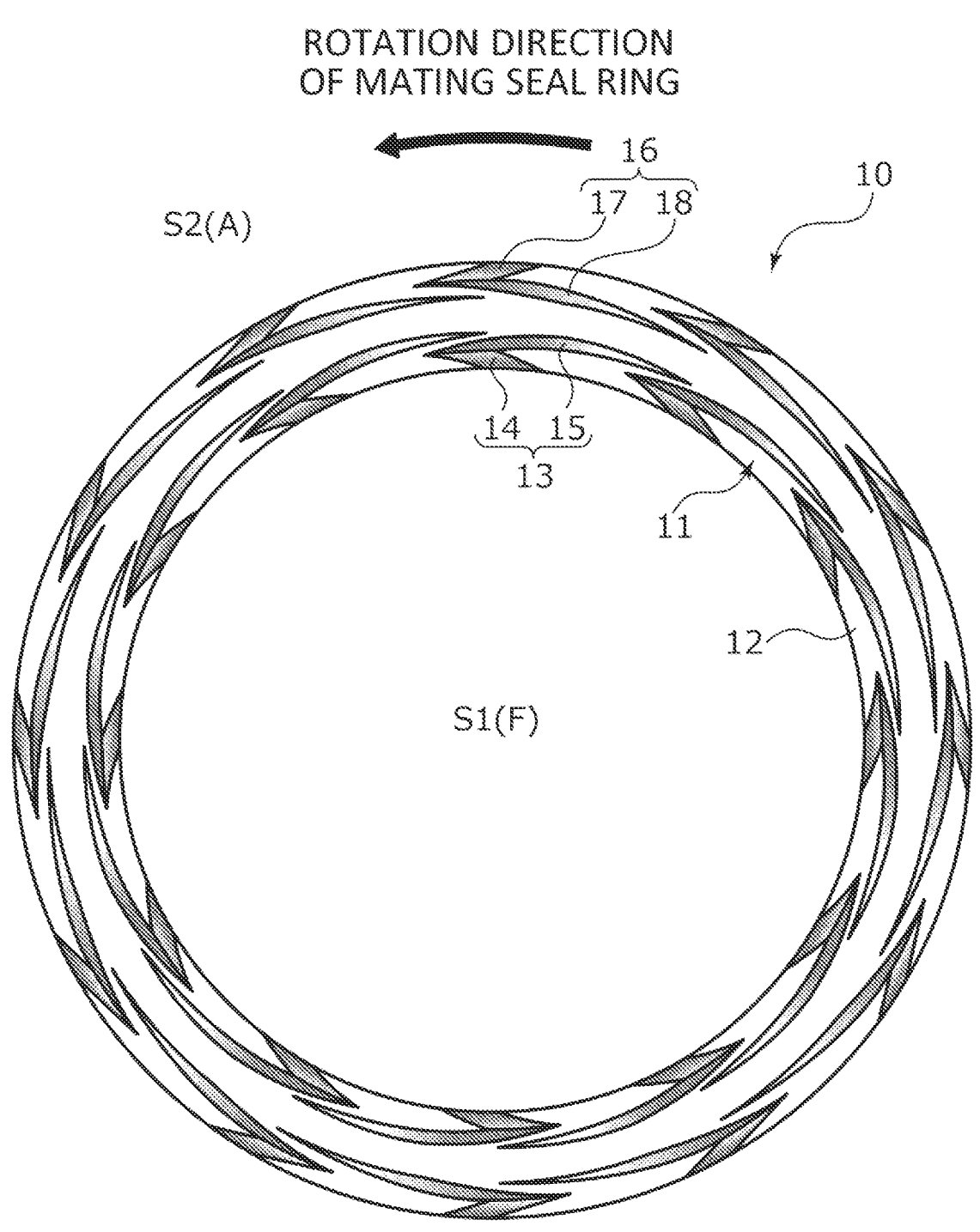
FIG. 2 is a view of a sliding surface of a stationary seal ring in the first embodiment when viewed in an axial direction.
Figure 3:
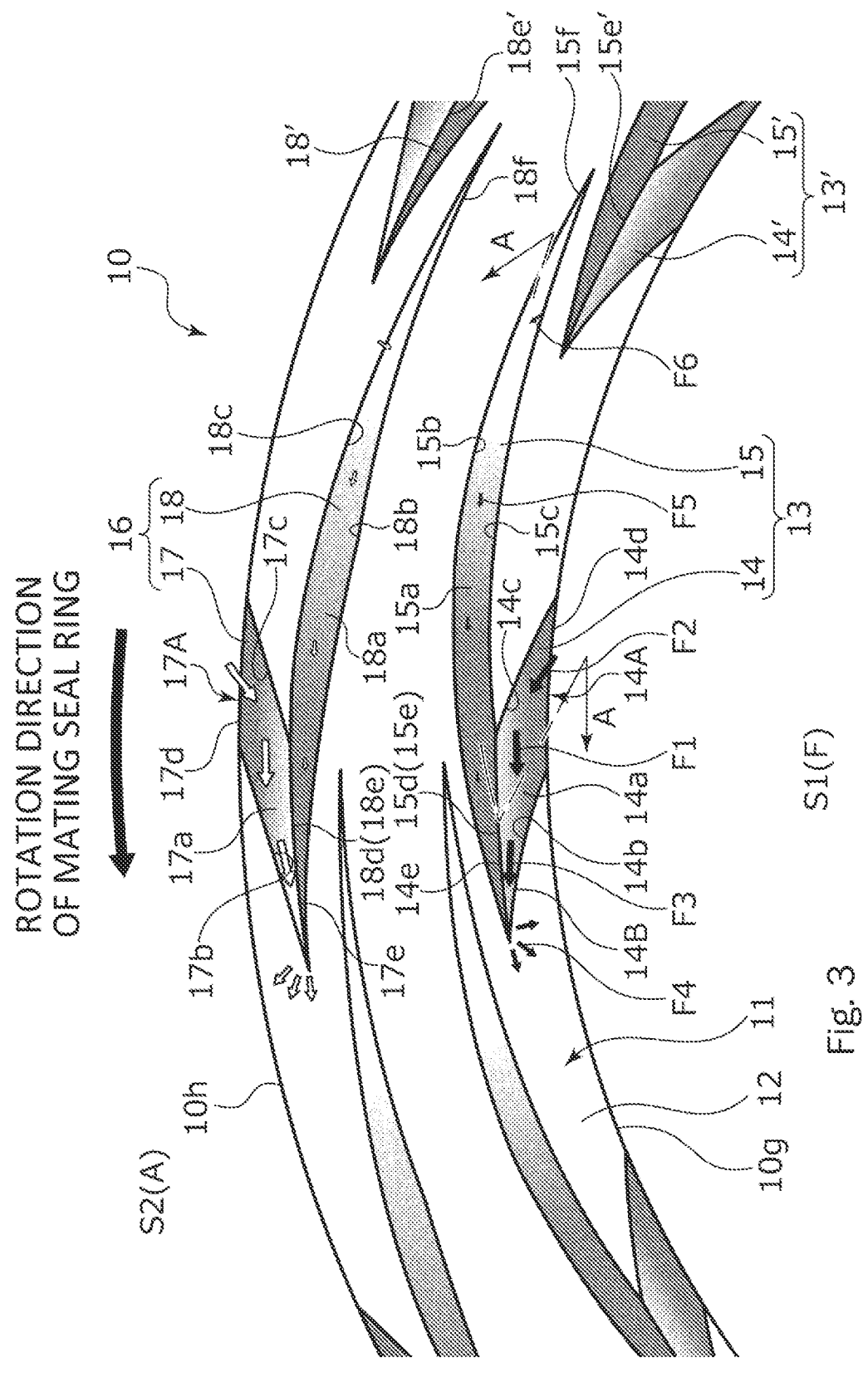
FIG. 3 is an enlarged view of the sliding surface of the stationary seal ring in the first embodiment when viewed in the axial direction.

As illustrated in FIGS. 2 and 3, the rotating seal ring 20 that is a mating seal ring slides counterclockwise relative to the stationary seal ring 10 as indicated by a solid arrow. Hereinafter, this state will be described as relative rotation of the stationary seal ring 10 and the rotating seal ring 20 in a forward direction.

A plurality of dynamic pressure generation mechanisms 13 and a plurality of dynamic pressure generation mechanisms 16 are provided on the radially inner side and the radially outer side of the sliding surface 11 of the stationary seal ring 10, respectively. The dynamic pressure generation mechanisms 13 (12 in the present embodiment) are evenly arranged in a circumferential direction on the radially inner side of the sliding surface 11. The dynamic pressure generation mechanisms 16 (12 in the present embodiment) are evenly arranged in the circumferential direction on the radially outer side of the sliding surface 11. Incidentally, in the present embodiment, the dynamic pressure generation mechanisms 13 and 16 are disposed side by side in the radial direction; however, the dynamic pressure generation mechanisms 13 and 16 are not limited thereto, and may be disposed to be offset from each other in the circumferential direction.

In addition, portions of the sliding surface 11 other than the dynamic pressure generation mechanisms 13 and 16 are lands 12 disposed on the same plane and forming a flat surface. The flat surface of the lands 12 functions as a sliding surface that substantially slides against the sliding surface 21 of the rotating seal ring 20.

As illustrated in FIG. 3, each of the dynamic pressure generation mechanisms 13 on the radially inner side includes a first dynamic pressure generation groove 14 and a second dynamic pressure generation groove 15. The first dynamic pressure generation groove 14 communicates with the inner space S1, and extends linearly from an inner peripheral surface 10g of the stationary seal ring 10 in a radially outward direction while being inclined with respect to a relative rotation direction. The second dynamic pressure generation groove 15 extends linearly from a radially outer-side end portion of the first dynamic pressure generation groove 14 in the radially outward direction while being inclined in a direction opposite to the first dynamic pressure generation groove 14 with respect to the relative rotation direction. The groove "being inclined" referred to here indicates that the groove extends in a longitudinal direction in non-parallel to the relative rotation direction (namely, the circumferential direction) and the groove extends non-or-thogonal to the relative rotation direction. Incidentally, the location of a part of the groove may be parallel or orthogonal to the relative rotation direction (namely, the circumferential direction).

In addition, the first dynamic pressure generation groove 14 and the second dynamic pressure generation groove 15 are disposed side by side in the radial direction, and are connected to each other at end portions.

In addition, the second dynamic pressure generation groove 15 has a longer groove length in a groove extension direction, in other words, a longer groove length in a groove longitudinal direction or a longer groove length in a groove inclination direction, in detail, a longer circumferential component in the groove extension direction than the first dynamic pressure generation groove 14. Incidentally, the first dynamic pressure generation groove 14 and the second dynamic pressure generation groove 15 have a radial component of substantially the same length in the groove extension direction.

In addition, end portions of the second dynamic pressure generation grooves 15 adjacent to each other are disposed to overlap each other in the radial direction. In detail, an end portion of the second dynamic pressure generation groove 15 on an upstream side of the relative rotation, namely, an end portion including an end edge 15f is disposed on the radially outer side to overlap an end portion of a second dynamic pressure generation groove 15' on a downstream side of the relative rotation, the second dynamic pressure generation groove 15' being adjacent thereto in the circumferential direction, namely, an end portion including an end edge 15e' in the radial direction.

The first dynamic pressure generation groove 14 includes a bottom surface 14a and side surfaces 14b and 14c. The bottom surface 14a extends linearly while being inclined with respect to the flat surface of the lands 12. The side surfaces 14b and 14c rise from both circumferential end edges of the bottom surface 14a. In addition, an opening 14A communicating with the inner space S1 is formed on a radially inner-side end portion of the first dynamic pressure generation groove 14.

Figure 4:
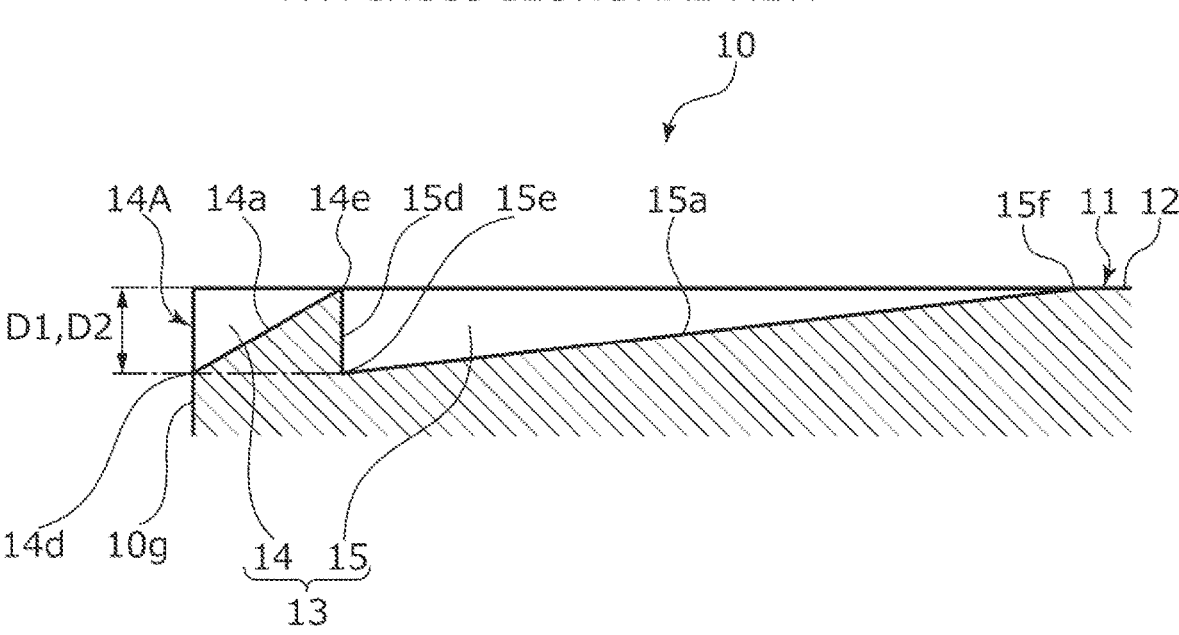
FIG. 4 is a cross-sectional view taken along line A-A of FIG. 3.

As illustrated in FIG. 4, the first dynamic pressure generation groove 14 is inclined in the radial direction with respect to the flat surface of the lands 12 such that an end edge 14d on the radially inner side of the bottom surface 14a located at the opening 14A communicating with the inner space S1 is the deepest and an end edge 14e on the radially outer side of the bottom surface 14a is the shallowest. Namely, the first dynamic pressure generation groove 14 is formed such that the depth becomes shallower from the end edge 14d on the radially inner side toward the end edge 14e on the radially outer side of the bottom surface 14a. In addition, the first dynamic pressure generation groove 14 is formed such that the upstream side of the relative rotation is deep and the downstream side of the relative rotation is shallow for the relative rotation in the forward direction indicated by a solid arrow in FIGS. 2 and 3.

As illustrated in FIG. 3, the second dynamic pressure generation groove 15 includes a bottom surface 15a, side surfaces 15b and 15c, and a radially inner-side end surface 15d. The bottom surface 15a extends linearly while being inclined with respect to the flat surface of the lands 12. The side surfaces 15b and 15c rise from both circumferential end edges of the bottom surface 15*a*. The radially inner-side end surface 15*d* rises from a radially inner end of the bottom surface 15*a*, and is orthogonally connected to the side surfaces 15*b* and 15*c*.

As illustrated in FIG. 4, the second dynamic pressure generation groove 15 is inclined in the radial direction with respect to the flat surface of the lands 12 such that an end edge 15*e* on the radially inner side of the bottom surface 15*a* is the deepest and the end edge 15*f* on the radially outer side of the bottom surface 15*a* is the shallowest. Namely, the second dynamic pressure generation groove 15 is formed such that the depth becomes shallower from the end edge 15*e* on the radially inner side toward the end edge 15*f* on the radially outer side of the bottom surface 15*a*. In addition, the second dynamic pressure generation groove 15 is formed such that the upstream side of the relative rotation is shallow and the downstream side of the relative rotation is deep for the relative rotation in the forward direction indicated by the solid arrow in FIGS. 2 and 3.

In such a manner, the first dynamic pressure generation groove 14 and the second dynamic pressure generation groove 15 forming the dynamic pressure generation mechanism 13 are in an opposite depth relationship with respect to the relative rotation direction.

In addition, a depth D1 at the end edge 14*d* on the radially inner side of the bottom surface 14*a* of the first dynamic pressure generation groove 14 is formed to be same as a depth D2 at the end edge 15*e* on the radially inner side of the bottom surface 15*a* of the second dynamic pressure generation groove 15 (D1=D2). In other words, the deepest locations of the first dynamic pressure generation groove 14 and the second dynamic pressure generation groove 15 have the same depth. Incidentally, in FIG. 4, for convenience of description, the depths D1 and D2 of the first dynamic pressure generation groove 14 and the second dynamic pressure generation groove 15 are represented as deeper than actual ones. In addition, in the present embodiment, the end edge 14*e* on the radially outer side of the bottom surface 14*a* of the first dynamic pressure generation groove 14 and the end edge 15*f* on the radially outer side of the bottom surface 15*a* of the second dynamic pressure generation groove 15 are disposed on the same plane as the flat surface of the lands 12, and have substantially no depth.

Incidentally, in the present embodiment, in FIG. 4, an inclination of the bottom surface 14*a* of the first dynamic pressure generation groove 14 in the radial direction with respect to the flat surface of the lands 12 is represented as larger than an inclination of the bottom surface 15*a* of the second dynamic pressure generation groove 15 in the radial direction with respect to the flat surface of the lands 12. The reason is that FIG. 4 is a cross-sectional view taken along line A-A of FIG. 3 and, as described above, the second dynamic pressure generation groove 15 is formed with a longer groove length in the groove extension direction, in detail, a longer circumferential component in the groove extension direction than the first dynamic pressure generation groove 14.

Figure 5:
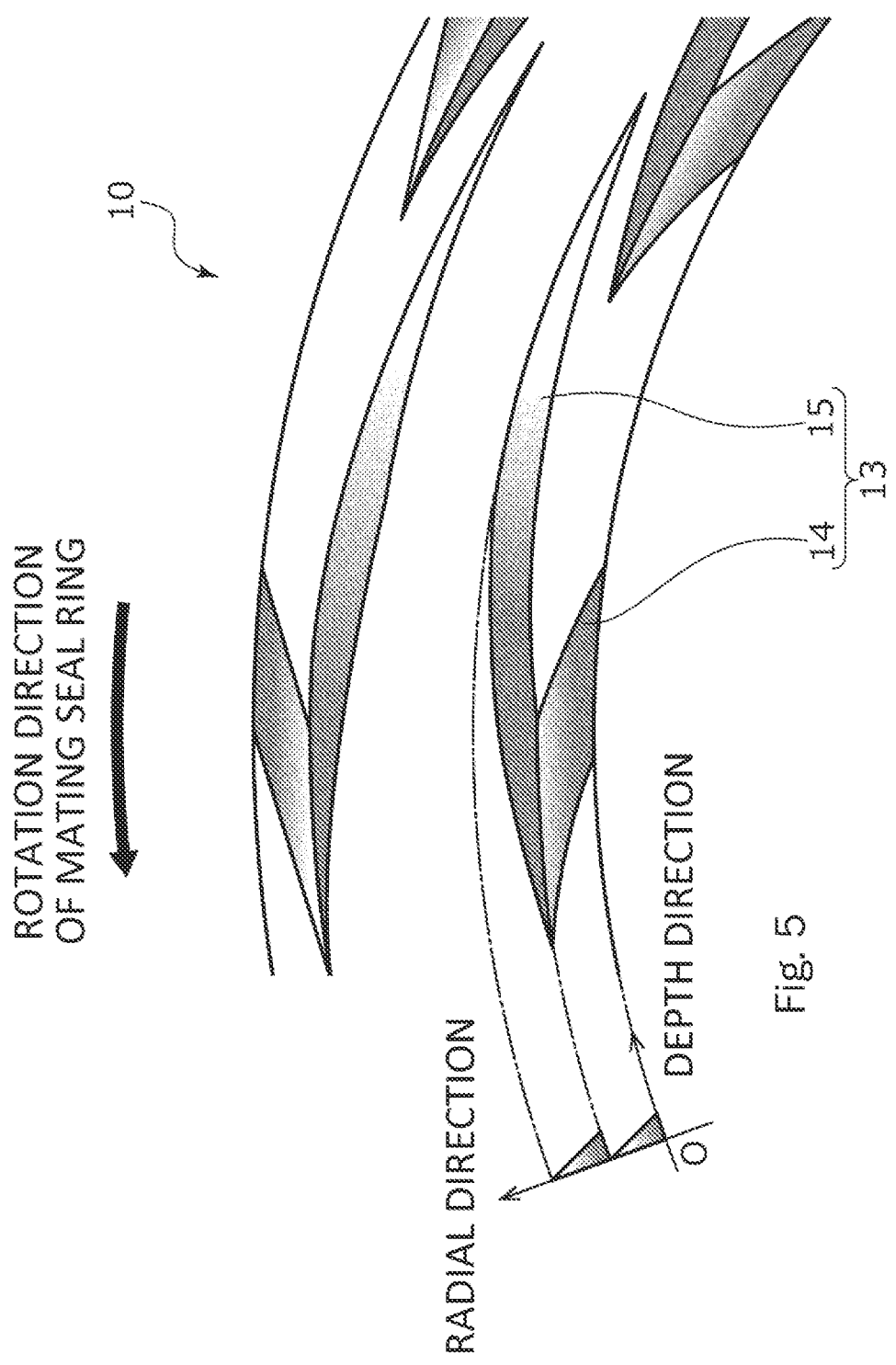
FIG. 5 is a view illustrating depth distributions of a first dynamic pressure generation groove and a second dynamic pressure generation groove in the first embodiment in the radial direction.

In addition, in the present embodiment, as illustrated in FIG. 5, the first dynamic pressure generation groove 14 and the second dynamic pressure generation groove 15 are formed such that depth distributions in the radial direction have the same degree of inclination.

As illustrated in FIG. 3, the dynamic pressure generation mechanisms 16 on the radially outer side includes a first dynamic pressure generation groove 17 and a second dynamic pressure generation groove 18. The first dynamic pressure generation groove 17 communicates with the outer space S2, and extends linearly from an outer peripheral surface 10*h* of the stationary seal ring 10 in a radially inward direction while being inclined with respect to the relative rotation direction. The second dynamic pressure generation groove 18 extends linearly from a radially inner-side end portion of the first dynamic pressure generation groove 17 in the radially inward direction while being inclined in a direction opposite to the first dynamic pressure generation groove 17 with respect to the relative rotation direction.

In addition, the first dynamic pressure generation groove 17 and the second dynamic pressure generation groove 18 are disposed side by side in the radial direction, and are connected to each other at end portions.

In addition, the second dynamic pressure generation groove 18 has a longer groove length in a groove extension direction, in detail, a longer circumferential component in the groove extension direction than the first dynamic pressure generation groove 17. Incidentally, the first dynamic pressure generation groove 17 and the second dynamic pressure generation groove 18 have a radial component of substantially the same length in the groove extension direction.

In addition, end portions of the second dynamic pressure generation grooves 18 adjacent to each other are disposed to overlap each other in the radial direction. In detail, an end portion of the second dynamic pressure generation groove 18 on the upstream side of the relative rotation, namely, an end portion including an end edge 18*f* is disposed on the radially inner side to overlap an end portion of a second dynamic pressure generation groove 18' on the downstream side of the relative rotation, the second dynamic pressure generation groove 18' being adjacent thereto in the circumferential direction, namely, an end portion including an end edge 18*e*' in the radial direction.

The first dynamic pressure generation groove 17 includes a bottom surface 17*a* and side surfaces 17*b* and 17*c*. The bottom surface 17*a* extends linearly while being inclined with respect to the flat surface of the lands 12. The side surfaces 17*b* and 17*c* rise from both circumferential end edges of the bottom surface 17*a*. In addition, an opening 17A communicating with the outer space S2 is formed on a radially outer-side end portion of the first dynamic pressure generation groove 17.

Although not illustrated for convenience of description, the first dynamic pressure generation groove 17 is inclined in the radial direction with respect to the flat surface of the lands 12 such that an end edge 17*d* on the radially outer side of the bottom surface 17*a* located at the opening 17A communicating with the outer space S2 is the deepest and an end edge 17*e* on the radially inner side of the bottom surface 17*a* is the shallowest. Namely, the first dynamic pressure generation groove 17 is formed such that the depth becomes shallower from the end edge 17*d* on the radially outer side toward the end edge 17*e* on the radially inner side of the bottom surface 17*a*. In addition, the first dynamic pressure generation groove 17 is formed such that the upstream side of the relative rotation is deep and the downstream side of the relative rotation is shallow for the relative rotation in the forward direction indicated by the solid arrow in FIGS. 2 and 3.

The second dynamic pressure generation groove 18 includes a bottom surface 18*a*, side surfaces 18*b* and 18*c*, and a radially outer-side end surface 18*d*. The bottom surface 18*a* extends linearly while being inclined with respect to the flat surface of the lands 12. The side surfaces 18*b* and 18*c* rise from both circumferential end edges of the bottom surface 18*a*. The radially outer-side end surface 18*d* rises from a radially inner end of the bottom surface 18a, and is orthogonally connected to the side surfaces 18b and 18c.

Although not illustrated for convenience of description, the second dynamic pressure generation groove 18 is inclined in the radial direction with respect to the flat surface of the lands 12 such that an end edge 18e on the radially outer side of the bottom surface 18a is the deepest and the end edge 18f on the radially inner side of the bottom surface 18a is the shallowest. Namely, the second dynamic pressure generation groove 18 is formed such that the depth becomes shallower from the end edge 18e on the radially outer side of the bottom surface 18a toward the end edge 18f on the radially inner side of the bottom surface 18a. In addition, the second dynamic pressure generation groove 18 is formed such that the upstream side of the relative rotation is shallow and the downstream side of the relative rotation is deep for the relative rotation in the forward direction indicated by the solid arrow in FIGS. 2 and 3.

In such a manner, the first dynamic pressure generation groove 17 and the second dynamic pressure generation groove 18 forming the dynamic pressure generation mechanism 16 are in an opposite depth relationship with respect to the relative rotation direction. In addition, the first dynamic pressure generation groove 17 and the second dynamic pressure generation groove 18 are formed such that the dynamic pressure generation mechanism 16 is in a so-called mirror image relationship with respect to the dynamic pressure generation mechanism 13 based on a center line (not illustrated) of the sliding surface in the radial direction.

Next, the operation of the stationary seal ring 10 and the rotating seal ring 20 during relative rotation in the forward direction will be described with reference to FIG. 3. Incidentally, in FIG. 3, the flow of the sealed fluid F is indicated by black arrows, and the flow of the atmosphere A is indicated by white arrows.

First, when the rotating seal ring 20 is not in rotation and is stopped, the sealed fluid F flows into the first dynamic pressure generation groove 14 from the opening 14A, and the sealed fluid F that has flowed into the first dynamic pressure generation groove 14 also flows slightly into the second dynamic pressure generation groove 15 connected to the radially outer side, by crossing over the end edge 14e on the radially outer side of the bottom surface 14a. In addition, the atmosphere A flows into the first dynamic pressure generation groove 17 from the opening 17A, and the atmosphere A that has flowed into the first dynamic pressure generation groove 17 also flows slightly into the second dynamic pressure generation groove 18 connected to the radially inner side, by crossing over the end edge 17e on the radially inner side of the bottom surface 17a. Incidentally, since the stationary seal ring 10 is biased to a rotating seal ring 20 side by the elastic member 7, the sliding surfaces 11 and 21 are in the state of contact with each other, and there is almost no leakage of the sealed fluid F between the sliding surfaces 11 and 21 to the outer space S2.

As illustrated in FIG. 3, when the rotating seal ring 20 rotates relative to the stationary seal ring 10 in the forward direction, the sealed fluid F inside the first dynamic pressure generation groove 14 and the second dynamic pressure generation groove 15 follows and moves in the rotation direction of the rotating seal ring 20 due to shear with the sliding surface 21.

Specifically, inside the first dynamic pressure generation groove 14, as indicated by an arrow F1, the sealed fluid F moves from the vicinity of the opening 14A toward the end edge 14e on the radially outer side. Accordingly, a fluid pressure in the vicinity of the opening 14A becomes relatively lower than a surrounding fluid pressure. In other words, a relative negative pressure is generated in the vicinity of the opening 14A, and as indicated by an arrow F2, the sealed fluid F in the inner space S1 is suctioned into the first dynamic pressure generation groove 14.

In addition, since the depth D1 the end edge 14d on the radially inner side located at the opening 14A is the deepest in the first dynamic pressure generation groove 14 (refer to FIG. 4), a large amount of the sealed fluid F can flow into the first dynamic pressure generation groove 14.

In addition, inside the first dynamic pressure generation groove 14, as indicated by an arrow F3, the sealed fluid F moves toward the end edge 14e on the radially outer side along the side surface 14b. The sealed fluid F that has moved toward the end edge 14e is increased in pressure at a corner portion 14B formed by the end edge 14e and the side surface 14b and in the vicinity of the corner portion 14B. Namely, a positive pressure is generated at the corner portion 14B of the first dynamic pressure generation groove 14 and in the vicinity thereof.

In addition, since the depth of the first dynamic pressure generation groove 14 becomes shallower from the end edge 14d on the radially inner side toward the end edge 14e on the radially outer side, the sealed fluid F is easily increased in pressure even in the process of moving toward the corner portion 14B of the first dynamic pressure generation groove 14. In addition, even when the movement amount of the sealed fluid F is small due to a low rotation speed of the rotating seal ring 20, a positive pressure is likely to be generated at the corner portion 14B of the first dynamic pressure generation groove 14 and in the vicinity thereof.

In addition, the sliding surfaces 11 and 21 are slightly separated from each other by a force caused by the positive pressure generated at the corner portion 14B of the first dynamic pressure generation groove 14 and in the vicinity thereof (not illustrated). Accordingly, as indicated by an arrow F4, the sealed fluid F inside the first dynamic pressure generation groove 14 mainly flows into a gap between the sliding surfaces 11 and 21. Since the sealed fluid F is interposed between the sliding surfaces 11 and 21 in such a manner, lubricity can be improved and wear between the sliding surfaces 11 and 21 can be suppressed. Incidentally, since the floating distance between the sliding surfaces 11 and 21 is slight, the amount of the sealed fluid F flowing out from the first dynamic pressure generation groove 14 into the gap between the sliding surfaces 11 and 21 is small, and even when the sealed fluid F flows into the gap between the sliding surfaces 11 and 21, since the sealed fluid F is collected by the second dynamic pressure generation groove 15 of the dynamic pressure generation mechanism 13 adjacent in the circumferential direction (refer to an arrow F6), there is almost no leakage to the outer space S2.

In addition, inside the second dynamic pressure generation groove 15, as indicated by an arrow F5, the sealed fluid F moves from the end edge 15f on the radially outer side toward the end edge 15e on the radially inner side. Since the depth of the second dynamic pressure generation groove 15 becomes deeper from the end edge 15f on the radially outer side toward the end edge 15e on the radially inner side, almost no dynamic pressure is generated inside the second dynamic pressure generation groove 15.

In detail, a relative negative pressure is generated in the vicinity of the end edge 15f on the radially outer side of the second dynamic pressure generation groove 15, and a relative positive pressure is generated in the vicinity of the end edge 15e on the radially inner side, but the absolute values of the negative pressure and the positive pressure are very small. For this reason, as described above, a dynamic pressure is much less likely to be generated in the second dynamic pressure generation groove 15 than in the first dynamic pressure generation groove 14.

In addition, as indicated by the arrow F6, the sealed fluid F that has flowed out from a first dynamic pressure generation groove 14' of the dynamic pressure generation mechanism 13', which is adjacent on the upstream side of the relative rotation in the circumferential direction, into the gap between the sliding surfaces 11 and 21 is suctioned into the second dynamic pressure generation groove 15. Further, a fraction of the sealed fluid F that has crossed over the end edge 14*e* of the first dynamic pressure generation groove 14 of the same dynamic pressure generation mechanism 13 flows into the second dynamic pressure generation groove 15. For this reason as well, a dynamic pressure is less likely to be generated in the second dynamic pressure generation groove 15.

Further, as illustrated in FIG. 5, the bottom surfaces 14*a* and 15*a* of the first dynamic pressure generation groove 14 and the second dynamic pressure generation groove 15 are inclined such that the depth distributions in the radial direction have the same linear degree of inclination, so that a positive pressure is more likely to be generated in the first dynamic pressure generation groove 14, and a negative pressure is less likely to be generated in the second dynamic pressure generation groove 15. Incidentally, these inclinations may be curved rather than linear. In addition, the inclination of the first dynamic pressure generation groove 14 and the inclination of the second dynamic pressure generation groove 15 may not be the same degree of inclination in depth distribution in the radial direction.

Incidentally, since the flow of the atmosphere A in the dynamic pressure generation mechanism 16 can be described as substantially the same flow as the sealed fluid F in the dynamic pressure generation mechanism 13 described above (refer to the white arrows illustrated in FIG. 3), the detailed description will be omitted.

Next, the operation of the stationary seal ring 10 and the rotating seal ring 20 during relative rotation in a reverse direction will be described with reference to FIG. 6. Incidentally, similarly to FIG. 3, in FIG. 6 as well, the flow of the sealed fluid F is indicated by black arrows, and the flow of the atmosphere A is indicated by white arrows. In addition, since a mode when the rotating seal ring 20 is stopped is the same, the description will be omitted.

Figure 6:
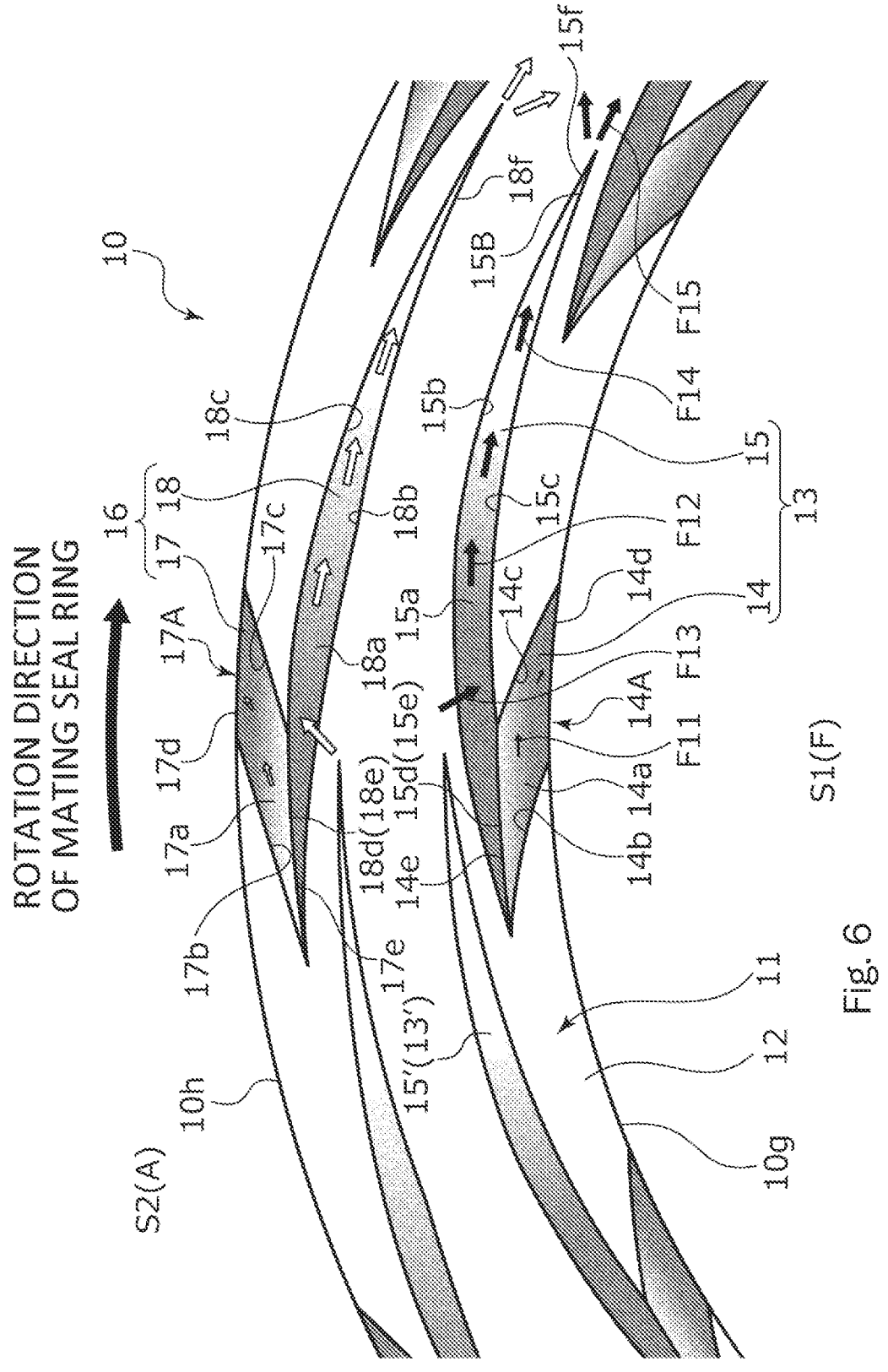
FIG. 6 is an enlarged view of the sliding surface of the stationary seal ring in the first embodiment when viewed in the axial direction.

As illustrated in FIG. 6, when the rotating seal ring 20 rotates relative to the stationary seal ring 10 in the reverse direction, the sealed fluid F inside the first dynamic pressure generation groove 14 and the second dynamic pressure generation groove 15 follows and moves in the rotation direction of the rotating seal ring 20 due to shear with the sliding surface 21.

Specifically, inside the first dynamic pressure generation groove 14, as indicated by an arrow F11, the sealed fluid F moves from the end edge 14*e* on the radially outer side toward the opening 14A. Since the depth of the first dynamic pressure generation groove 14 becomes deeper from the end edge 14*e* on the radially outer side toward the end edge 14*d* on the radially inner side, almost no dynamic pressure is generated inside the first dynamic pressure generation groove 14.

In detail, a relative negative pressure is generated in the vicinity of the end edge 14*e* on the radially outer side of the first dynamic pressure generation groove 14, and a relative positive pressure is generated in the vicinity of the end edge 14*d* on the radially inner side, but the absolute values of the negative pressure and the positive pressure are very small. For this reason, as described above, a dynamic pressure is much less likely to be generated in the first dynamic pressure generation groove 14 than in the second dynamic pressure generation groove 15.

In addition, since the first dynamic pressure generation groove 14 communicates with the inner space S1 through the opening 14A, almost no dynamic pressure is generated inside the first dynamic pressure generation groove 14. For this reason, almost no sealed fluid F is suctioned from between the sliding surfaces 11 and 21 into the first dynamic pressure generation groove 14.

In addition, inside the second dynamic pressure generation groove 15, as indicated by an arrow F12, the sealed fluid F moves from the end edge 15*e* on the radially inner side toward the end edge 15*f* on the radially outer side. Accordingly, a fluid pressure at the end edge 15*e* on the radially inner side becomes relatively lower than a surrounding fluid pressure. In other words, a relative negative pressure is generated in the vicinity of the end edge 15*e* on the radially inner side, and as indicated by an arrow F13, the sealed fluid F that has flowed out from the second dynamic pressure generation groove 15' of the dynamic pressure generation mechanism 13', which is adjacent on the upstream side of the relative rotation in the circumferential direction, into the gap between the sliding surfaces 11 and 21 is suctioned into the second dynamic pressure generation groove 15. Incidentally, as described above, since almost no dynamic pressure is generated in the first dynamic pressure generation groove 14, a fluid pressure at the end edge 15*e* on the radially inner side of the second dynamic pressure generation groove 15 becomes relatively lower than the fluid pressure at the end edge 14*e* on the radially outer side of the first dynamic pressure generation groove 14. For this reason, the sealed fluid F between the sliding surfaces 11 and 21 is more easily suctioned into the second dynamic pressure generation groove 15 than into the first dynamic pressure generation groove 14.

In addition, since the depth D2 of the end edge 15*e* on the radially inner side is the deepest in the second dynamic pressure generation groove 15 (refer to FIG. 4), a large amount of the sealed fluid F can flow into the second dynamic pressure generation groove 15.

In addition, inside the second dynamic pressure generation groove 15, as indicated by an arrow F14, the sealed fluid F moves toward the end edge 15*f* on the radially outer side along the side surface 15*b*. The sealed fluid F that has moved toward the end edge 15*f* is increased in pressure at a corner portion 15B formed by the end edge 15*f* and the side surface 15*b* and in the vicinity of the corner portion 15B. Namely, a positive pressure is generated at the corner portion 15B of the second dynamic pressure generation groove 15 and in the vicinity thereof.

In addition, since the depth of the second dynamic pressure generation groove 15 becomes shallower from the end edge 15*e* on the radially inner side toward the end edge 15*f* on the radially outer side, the sealed fluid F is easily increased in pressure even in the process of moving toward the corner portion 15B of the second dynamic pressure generation groove 15. In addition, even when the movement amount of the sealed fluid F is small due to a low rotation speed of the rotating seal ring 20, a positive pressure is likely to be generated at the corner portion 15B of the second dynamic pressure generation groove 15 and in the vicinity thereof.

Further, since the second dynamic pressure generation groove 15 is formed longer in the extension direction, in detail, with a longer circumferential component in the groove extension direction than the first dynamic pressure generation groove 14, the sealed fluid F is further increased in pressure in the process of moving toward the corner portion 15B of the second dynamic pressure generation groove 15.

In addition, the sliding surfaces 11 and 21 are slightly separated from each other by a force caused by the positive pressure generated at the corner portion 15B of the second dynamic pressure generation groove 15 and in the vicinity thereof (not illustrated). Accordingly, as indicated by an arrow F15, the sealed fluid F inside the second dynamic pressure generation groove 15 mainly flows into the gap between the sliding surfaces 11 and 21. Further, since the end edge 15$f$ on the radially outer side of the second dynamic pressure generation groove 15 is disposed on the same plane as the flat surface of the lands 12, a positive pressure is generated not only at the corner portion 15B but also in a wide range over the end edge 15$f$ on the radially outer side. Since the sealed fluid F is interposed between the sliding surfaces 11 and 21 in such a manner, lubricity can be improved and wear between the sliding surfaces 11 and 21 can be suppressed.

Incidentally, since the flow of the atmosphere A in the dynamic pressure generation mechanism 16 can be described as substantially the same flow as the sealed fluid F in the dynamic pressure generation mechanism 13 described above (refer to the white arrows illustrated in FIG. 6), the detailed description will be omitted.

Incidentally, in the present embodiment, during relative rotation in the forward direction illustrated in FIG. 3 and during relative rotation in the reverse direction illustrated in FIG. 6, positive pressures of the same degree are generated in the entirety of the dynamic pressure generation mechanisms 13 and 16.

As described above, in the first dynamic pressure generation grooves 14 and 17 and the second dynamic pressure generation grooves 15 and 18 forming the dynamic pressure generation mechanisms 13 and 16, the bottom surfaces are inclined in the same direction with respect to the radial direction, and depth relationships with respect to the relative rotation direction are opposite. According to this configuration, for relative rotation in the forward direction (refer to FIG. 3), the first dynamic pressure generation grooves 14 and 17 become shallower toward the end portions on the downstream side of the relative rotation, namely, the end portions including the end edges 14$e$ and 17$e$. The second dynamic pressure generation grooves 15 and 18 become deeper toward the end portions on the downstream side of the relative rotation, namely, the end portions including the end edges 15$e$ and 18$e$. Accordingly, a positive pressure is likely to be generated in the first dynamic pressure generation grooves 14 and 17, and a negative pressure is less likely to be generated in the second dynamic pressure generation grooves 15 and 18. On the other hand, for relative rotation in the reverse direction (refer to FIG. 6), a negative pressure is less likely to be generated in the first dynamic pressure generation grooves 14 and 17, and a positive pressure is likely to be generated in the second dynamic pressure generation grooves 15 and 18. For this reason, for the relative rotations in both directions, positive pressures are reliably generated in the entirety of the first and second dynamic pressure generation grooves provided on the sliding surface 11, to separate the sliding surfaces 11 and 21 from each other, so that the stationary seal ring 10 and the rotating seal ring 20 have excellent lubricity.

In addition, in the first dynamic pressure generation groove 14 forming the dynamic pressure generation mechanism 13, the end portion on a deep side, namely, the end portion including the end edge 14$d$ communicates with the inner space S1 that is a space on a sealed fluid F side as a sealed fluid side space, and in the first dynamic pressure generation groove 17 forming the dynamic pressure generation mechanism 16, the end portion on a deep side, namely, the end portion including the end edge 17$d$ communicates with the outer space S2 that is a space on an atmosphere A side as a leakage side space. According to this configuration, for the relative rotation in the forward direction, since the sealed fluid F or the atmosphere A is easily supplied into the first dynamic pressure generation grooves 14 and 17, the positive pressures are easily increased. In addition, for the relative rotation in the reverse direction, since the fluid is easily discharged from inside the first dynamic pressure generation grooves 14 and 17 to the inner space S1 or the outer space S2, a negative pressure is less likely to be generated.

In addition, the second dynamic pressure generation grooves 15 and 18 are closed grooves, and are formed with a longer groove length in the groove extension direction, in detail, a longer circumferential component in the groove extension direction than the first dynamic pressure generation grooves 14 and 17. According to this configuration, for the relative rotation in the reverse direction, the positive pressure generation capability of the second dynamic pressure generation grooves 15 and 18 not communicating with both the inner space S1 and the outer space S2 is enhanced. For this reason, for the relative rotations in both directions, positive pressures of the same degree are generated by the first dynamic pressure generation grooves 14 and 17 and the second dynamic pressure generation grooves 15 and 18.

In addition, since the first dynamic pressure generation grooves 14 and 17 and the second dynamic pressure generation grooves 15 and 18 are connected to each other substantially without the lands 12 interposed therebetween, the supply of the fluid between the first dynamic pressure generation grooves 14 and 17 and the second dynamic pressure generation grooves 15 and 18 is easily performed. Accordingly, in either relative rotation direction, since the fluid is supplied from the dynamic pressure generation groove in which a positive pressure is generated to the dynamic pressure generation groove in which a negative pressure is less likely to be generated, a negative pressure is much less likely to be generated in the dynamic pressure generation groove in which the negative pressure is generated.

In addition, the first dynamic pressure generation grooves 14 and 17 and the second dynamic pressure generation grooves 15 and 18 are disposed side by side in the radial direction. According to this configuration, since dynamic pressures having different magnitudes in the radial direction are generated on the sliding surface 11, the dynamic pressures are likely to be evenly generated in the circumferential direction of the sliding surface 11. In addition, the dynamic pressure generation mechanisms 13 and 16 can be efficiently disposed in the circumferential direction of the sliding surface 11.

In addition, the sliding surface 21 of the rotating seal ring 20 is a flat surface, and the first dynamic pressure generation grooves 14 and 17 and the second dynamic pressure generation grooves 15 and 18 are provided on the sliding surface 11 of the stationary seal ring 10. According to this configuration, the balance of the dynamic pressures generated in the entirety of the first dynamic pressure generation grooves 14 and 17 and the second dynamic pressure generation grooves 15 and 18 is easily adjusted.

In addition, since the first dynamic pressure generation grooves 14 and 17 and the second dynamic pressure generation grooves 15 and 18 are formed such that the deepest portions and the shallowest portions have the respective depths (refer to FIG. 4), for the relative rotations in both directions, the balances of the dynamic pressures generated in the entirety of the first dynamic pressure generation grooves 14 and 17 and the second dynamic pressure generation grooves 15 and 18 are easily adjusted to the same degree.

Second Embodiment

Next, sliding parts according to a second embodiment of the present invention will be described with reference to FIG. 7. Incidentally, the descriptions of configurations that are the same as and overlap with the configurations of the first embodiment will be omitted.

Figure 7:
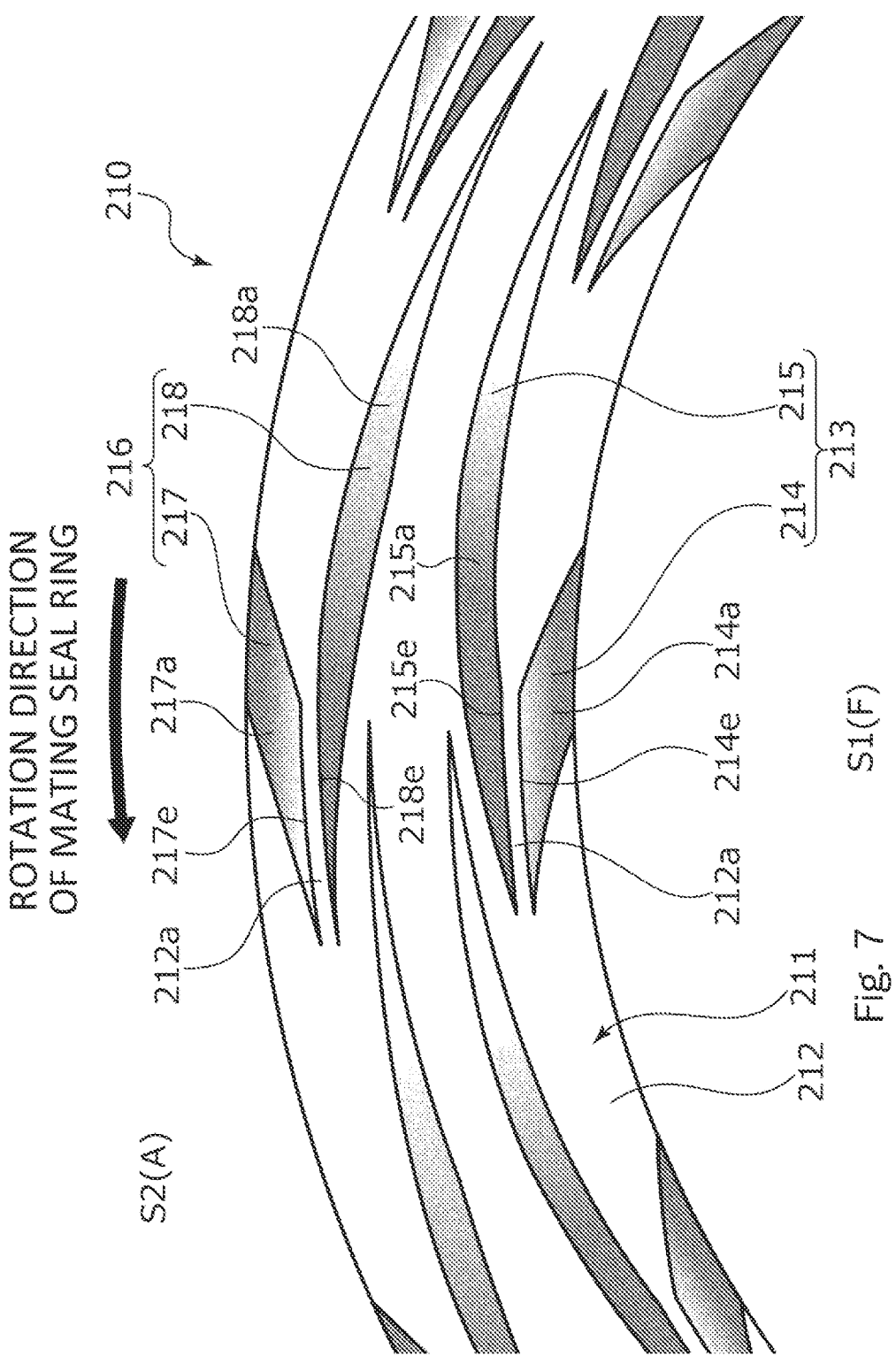
FIG. 7 is an enlarged view of a sliding surface of a stationary seal ring of sliding parts according to a second embodiment of the present invention when viewed in the axial direction.

As illustrated in FIG. 7, a stationary seal ring 210 of the second embodiment is different from that of the first embodiment in that a first dynamic pressure generation groove 214 and a second dynamic pressure generation groove 215 forming a dynamic pressure generation mechanism 213 and a first dynamic pressure generation groove 217 and a second dynamic pressure generation groove 218 forming a dynamic pressure generation mechanism 216 are each separated and are not connected to each other in the radial direction, and has the same configuration as that of the first embodiment in other aspects.

In the stationary seal ring 210 of the second embodiment, the first dynamic pressure generation grooves 214 and 217 and the second dynamic pressure generation grooves 215 and 218 are separated from each other in the radial direction. Namely, an end edge 214e on the radially outer side of a bottom surface 214a of the first dynamic pressure generation groove 214 and an end edge 215e on the radially inner side of a bottom surface 215a of the second dynamic pressure generation groove 215 are separated from each other substantially in parallel to each other, an end edge 217e on the radially inner side of a bottom surface 217a of the first dynamic pressure generation groove 217 and an end edge 218e on the radially outer side of a bottom surface 218a of the second dynamic pressure generation groove 218 are separated from each other substantially in parallel to each other, and a portion therebetween is a land 212a having a belt shape and extending in the circumferential direction. Incidentally, the land 212a having a belt shape is a part of a land 212.

In the stationary seal ring 210 of the second embodiment, compared to the mode of the first embodiment, since the sealed fluid F or the atmosphere A can flow into a gap between sliding surface 211 and 21 along each of the end edge 214e on the radially outer side of the first dynamic pressure generation groove 214 and the end edge 217e on the radially inner side of the first dynamic pressure generation groove 217, a positive pressure can be generated in a wider range.

Third Embodiment

Next, sliding parts according to a third embodiment of the present invention will be described with reference to FIG. 8.

Incidentally, the descriptions of configurations that are the same as and overlap with the configurations of the first embodiment will be omitted.

Figure 8:
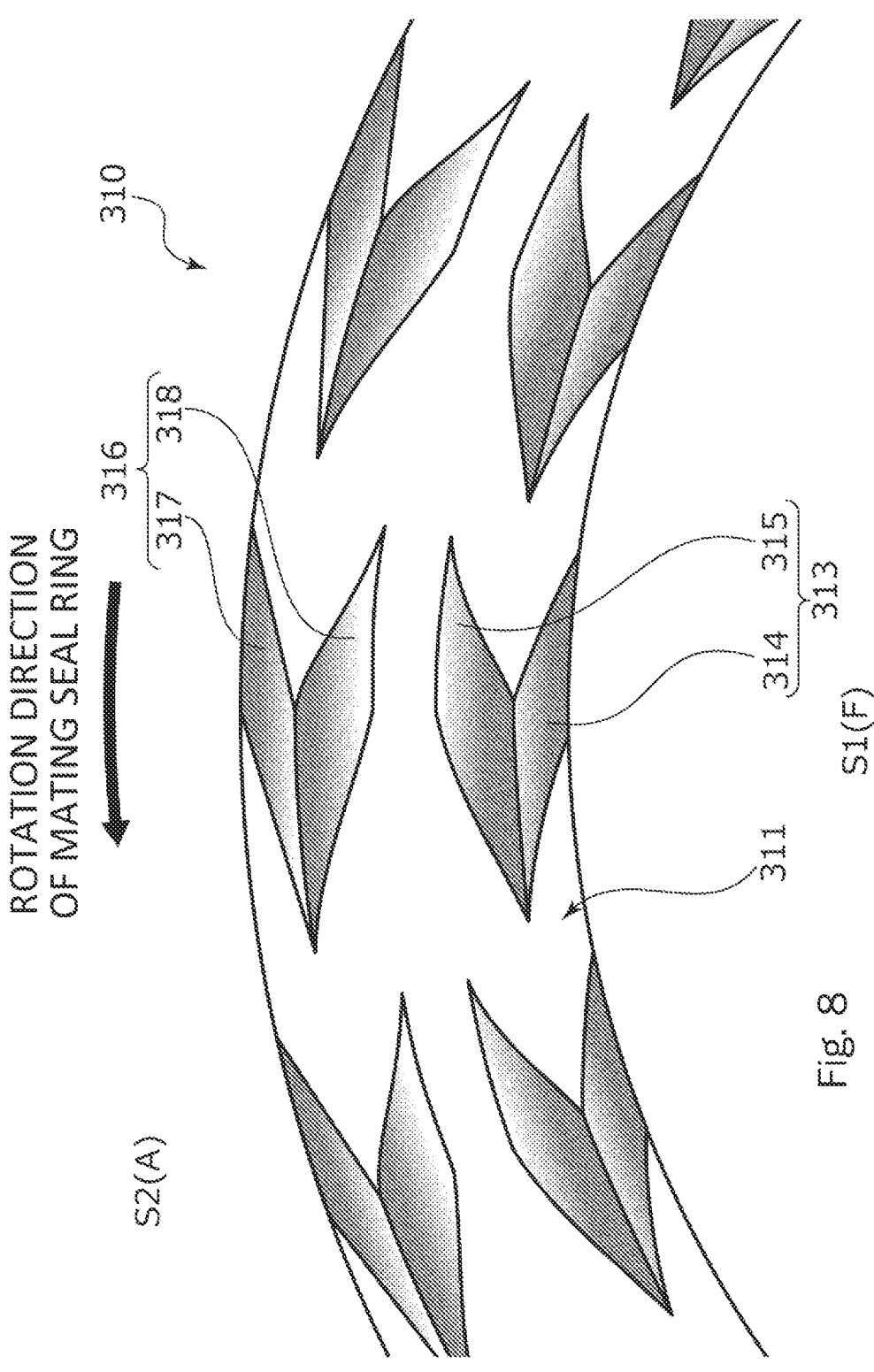
FIG. 8 is an enlarged view of a sliding surface of a stationary seal ring of sliding parts according to a third embodiment of the present invention when viewed in the axial direction.

As illustrated in FIG. 8, a stationary seal ring 310 of the third embodiment is different from that of the first embodiment in that a second dynamic pressure generation groove 315 forming a dynamic pressure generation mechanism 313 and a second dynamic pressure generation groove 318 forming a dynamic pressure generation mechanism 316 have longer radial components in extension directions and have circumferential components of substantially the same lengths in the groove extension directions as first dynamic pressure generation grooves 314 and 317, respectively, and have the same configuration as that of the first embodiment in other aspects.

In addition, although not illustrated for convenience of description, in the third embodiment, unlike the first embodiment, the second dynamic pressure generation grooves 315 and 318 are formed such that the depth distribution in the radial direction is more gently inclined than in the first dynamic pressure generation grooves 314 and 317.

In the stationary seal ring 310 of the third embodiment, since the second dynamic pressure generation grooves 315 and 318 are formed with the longer radial components in the extension directions and with the circumferential components of substantially the same lengths in the groove extension directions as the first dynamic pressure generation grooves 314 and 317, respectively, compared to the mode of the first embodiment, a large number of the dynamic pressure generation mechanisms 313 and 316 can be disposed in the circumferential direction, and a positive pressure can be generated in the circumferential direction of a sliding surface 311 in a well-balanced manner.

Fourth Embodiment

Next, sliding parts according to a fourth embodiment of the present invention will be described with reference to FIGS. 9 and 10. Incidentally, the descriptions of configurations that are the same as and overlap with the configurations of the first and third embodiments will be omitted.

Figure 9:
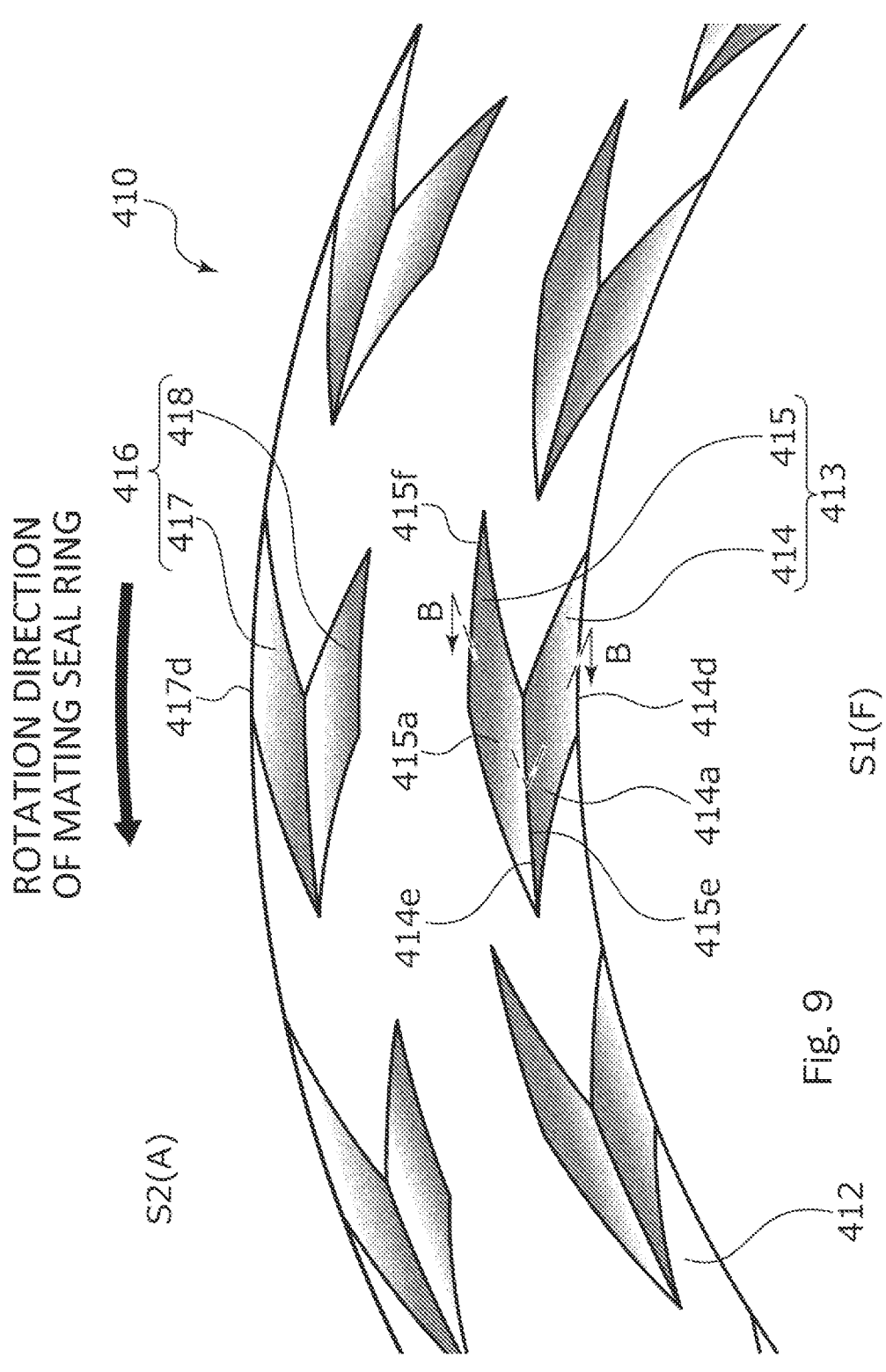
FIG. 9 is an enlarged view of a sliding surface of a stationary seal ring of sliding parts according to a fourth embodiment of the present invention when viewed in the axial direction.

As illustrated in FIG. 9, a stationary seal ring 410 of the fourth embodiment is formed such that in a first dynamic pressure generation groove 414 and a second dynamic pressure generation groove 415 forming a dynamic pressure generation mechanism 413 and in a first dynamic pressure generation groove 417 and a second dynamic pressure generation groove 418 forming a dynamic pressure generation mechanism 416, radial components and circumferential components in groove extension directions are formed with substantially the same respective lengths.

Figure 10:
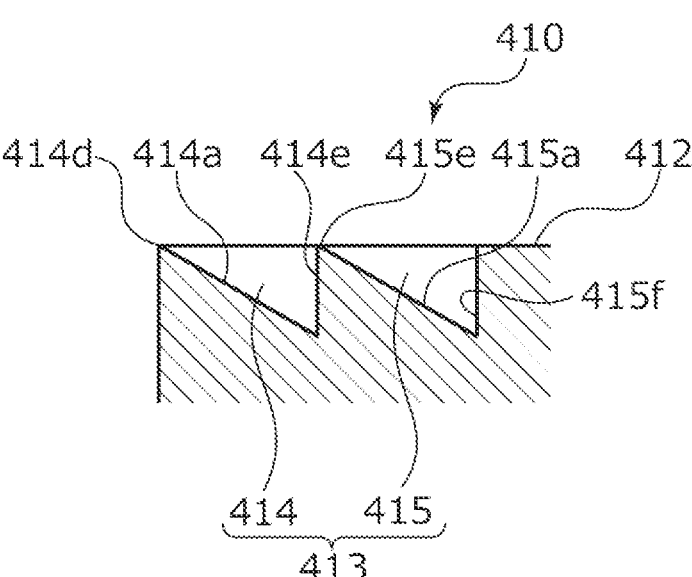
FIG. 10 is a cross-sectional view taken along line B-B of FIG. 9.

As illustrated in FIG. 10, the first dynamic pressure generation groove 414 is inclined in the radial direction with respect to the flat surface of the lands 12 such that an end edge 414d on the radially inner side of a bottom surface 414a is the shallowest and an end edge 414e on the radially outer side of the bottom surface 414a is the deepest. Namely, the first dynamic pressure generation groove 414 is formed such that the depth becomes deeper from the end edge 414d on the radially inner side toward the end edge 414e on the radially outer side of the bottom surface 414a. In addition, the first dynamic pressure generation groove 414 is formed such that for relative rotation in the forward direction indicated by a solid arrow in FIG. 9, an upstream side of the relative rotation is shallow and a downstream side of the relative rotation is deep.

The second dynamic pressure generation groove 415 is inclined in the radial direction such that an end edge 415e on the radially inner side of a bottom surface 415a is the shallowest and an end edge 415f on the radially outer side of the bottom surface 415a is the deepest. Namely, the second dynamic pressure generation groove 415 is formed such that the depth becomes deeper from the end edge 415e on the radially inner side toward the end edge 415f on the radially outer side of the bottom surface 415a. In addition, the second dynamic pressure generation groove 415 is formed such that for the relative rotation in the forward direction indicated by the solid arrow in FIG. 9, the upstream side of the relative rotation is deep and the downstream side of the relative rotation is shallow.

In addition, although not illustrated for convenience of description, in the fourth embodiment, the first dynamic pressure generation grooves 414 and 417 and the second dynamic pressure generation grooves 415 and 418 are formed such that depth distributions in the radial direction have inclinations opposite to those of the first embodiment.

In such a manner, the first dynamic pressure generation groove 414 and the second dynamic pressure generation groove 415 forming the dynamic pressure generation mechanism 413 are in an opposite depth relationship with respect to the relative rotation direction. In addition, although the detailed description is omitted, the first dynamic pressure generation groove 417 and the second dynamic pressure generation groove 418 are formed such that the dynamic pressure generation mechanism 416 is in a so-called mirror image relationship with respect to the dynamic pressure generation mechanism 413 based on a center line (not illustrated) of the sliding surface in the radial direction.

In the stationary seal ring 410 of the fourth embodiment, the first dynamic pressure generation grooves 414 and 417 are partitioned off from the inner space S1 or the outer space S2 by the end edges 414d and 417d having a wire shape. For this reason, the first dynamic pressure generation groove 414 and the second dynamic pressure generation groove 415 forming the dynamic pressure generation mechanism 413 and the first dynamic pressure generation groove 417 and the second dynamic pressure generation groove 418 forming the dynamic pressure generation mechanism 416 are formed with the radial components and the circumferential components of substantially the same respective lengths in the groove extension directions, so that positive pressures of the same degree can be generated for the relative rotations in both directions.

Fifth Embodiment

Next, sliding parts according to a fifth embodiment of the present invention will be described with reference to FIG. 11. Incidentally, the descriptions of configurations that are the same as and overlap with the configurations of the second embodiment will be omitted.

Figure 11:
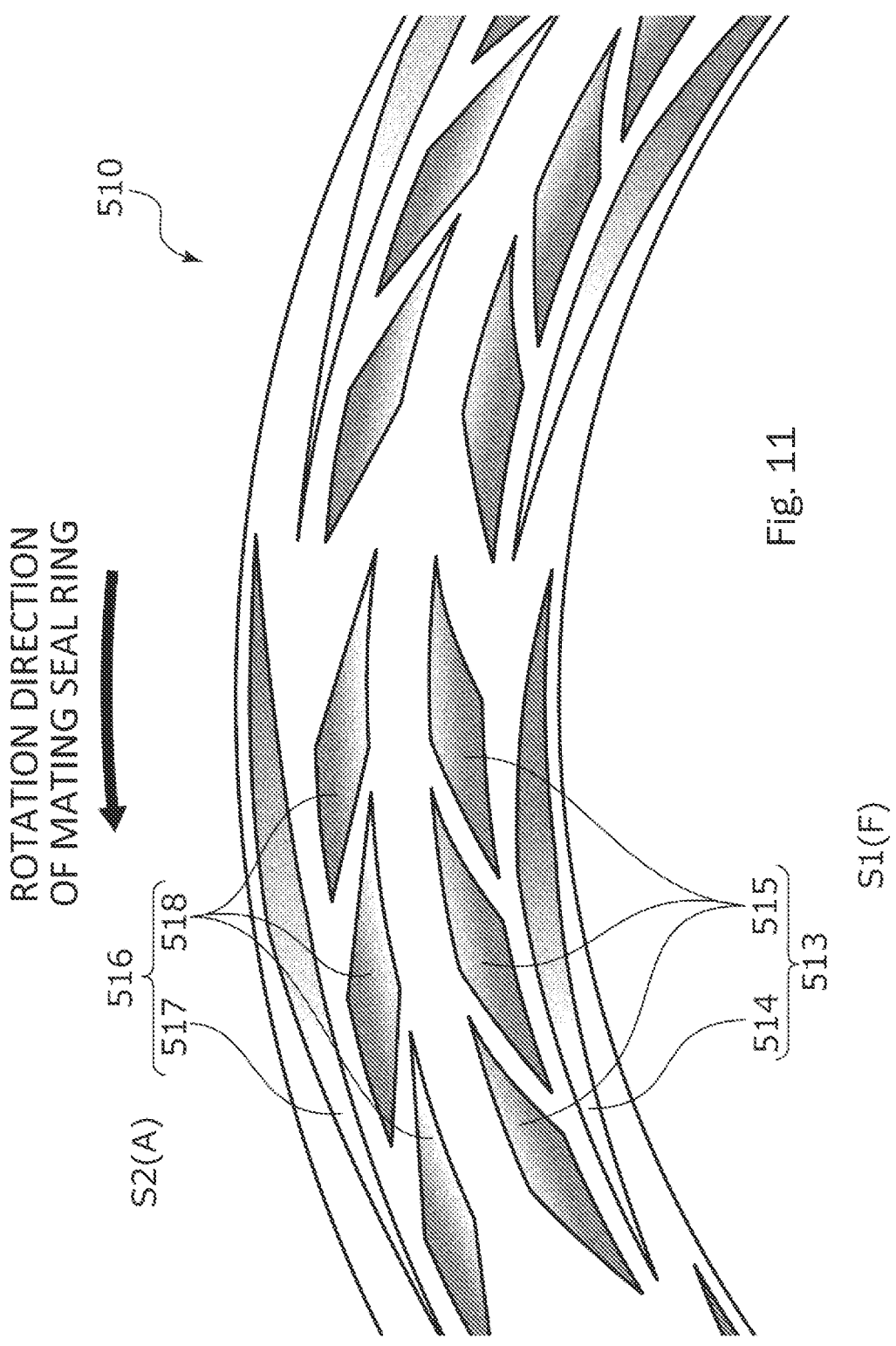
FIG. 11 is an enlarged view of a sliding surface of a stationary seal ring of sliding parts according to a fifth embodiment of the present invention when viewed in the axial direction.

As illustrated in FIG. 11, a stationary seal ring 510 of the fifth embodiment is different from those of the first and second embodiments in that a first dynamic pressure generation groove 514 forming a dynamic pressure generation mechanism 513 and a first dynamic pressure generation groove 517 forming a dynamic pressure generation mechanism 516 do not each communicate with the inner space S1 or the outer space S2, and are formed with longer circumferential components in groove extension directions than second dynamic pressure generation grooves 515 and 518, in that a plurality (three in the fifth embodiment) of the second dynamic pressure generation grooves 515 and 518 are disposed for one first dynamic pressure generation groove 514 and one first dynamic pressure generation groove 517, respectively, and in that the first dynamic pressure generation grooves 514 and 517 are formed larger in groove width than the second dynamic pressure generation grooves 515 and 518, respectively, and has the same configuration as that of the second embodiment in other aspects.

In the stationary seal ring 510 of the fifth embodiment, since the first dynamic pressure generation grooves 514 and 517 do not communicate with the inner space S1 or the outer space S2, the plurality of second dynamic pressure generation grooves 515 and 518 having lower positive pressure generation capability are disposed for the first dynamic pressure generation groove 514 and the first dynamic pressure generation groove 517, respectively, which are formed with long circumferential components in the groove extension directions and with large groove widths, so that positive pressures of the same degree can be generated for the relative rotations in both directions.

The embodiments of the present invention have been described above with reference to the drawings; however, the specific configurations are not limited to the embodiments, and modifications or additions that are made without departing from the scope of the present invention are included in the present invention.

For example, in the embodiments, the mechanical seals for automobiles have been described as examples of the sliding parts; however, the sliding parts may be other mechanical seals for general industrial machines or the like.

In addition, in the first to fifth embodiments, an example in which the first dynamic pressure generation grooves and the second dynamic pressure generation grooves forming the dynamic pressure generation mechanism are provided in the stationary seal ring has been described; however, the first dynamic pressure generation grooves and the second dynamic pressure generation grooves may be provided in the rotating seal ring, or one first dynamic pressure generation groove and one second dynamic pressure generation groove or both may be provided in the stationary seal ring and the rotating seal ring. In other words, the first sliding component and the second sliding component of the sliding parts according to the present invention may be the stationary seal ring and the rotating seal ring, respectively, or may be the rotational seal ring and the stationary seal ring, respectively.

In addition, in the first to fifth embodiments, the sealed fluid side and the leakage side have been described as a high-pressure side and a low-pressure side, respectively; however, the sealed fluid side and the leakage side may have substantially the same pressure.

In addition, in the first to fifth embodiments, the radially inner side and the radially outer side have been described as the sealed fluid side and the leakage side, respectively; however, the radially outer side and the radially inner side may be the sealed fluid side and the leakage side, respectively.

In addition, in the first to fifth embodiments, the sealed fluid F has been described as a high-pressure gas, but is not limited thereto, and may be a liquid or a low-pressure gas or may be in the form of a mist that is a mixture of liquid and gas.

In addition, in the first to fifth embodiments, the fluid on the leakage side has been described as the atmosphere A that is a low-pressure gas, but is not limited thereto, and may be a liquid or a high-pressure gas or may be in the form of a mist that is a mixture of liquid and gas.

In addition, in the first to fifth embodiments, a mode in which the first dynamic pressure generation grooves and the second dynamic pressure generation grooves extend linearly has been provided as an example; however, the first dynamic pressure generation grooves and the second dynamic pressure generation grooves may extend in a curved manner. Namely, when the grooves are viewed in the axial direction, the grooves may have a structure in which the grooves are narrowed on at least one side in the circumferential direction of the grooves.

In addition, in the first to fifth embodiments, a mode in which the bottom surfaces of the first dynamic pressure generation groove and the second dynamic pressure generation groove extend linearly while being inclined with respect to the flat surface of the lands has been provided as an example; however, the bottom surfaces of the first dynamic pressure generation groove and the second dynamic pressure generation groove may be curved or changed in a stepwise manner as long as the depths of the bottom surfaces become deeper or shallower in the groove extension directions.

In addition, in the first to fifth embodiments, a mode in which the shallowest end edges of the bottom surfaces of the first dynamic pressure generation groove and the second dynamic pressure generation groove are disposed on the same plane as the flat surface of the lands has been provided as an example; however, the shallowest end edges of the bottom surfaces of the first dynamic pressure generation groove and the second dynamic pressure generation groove may have a predetermined depth as long as the depth enables positive pressures to be sufficiently generated.

Figure 12:
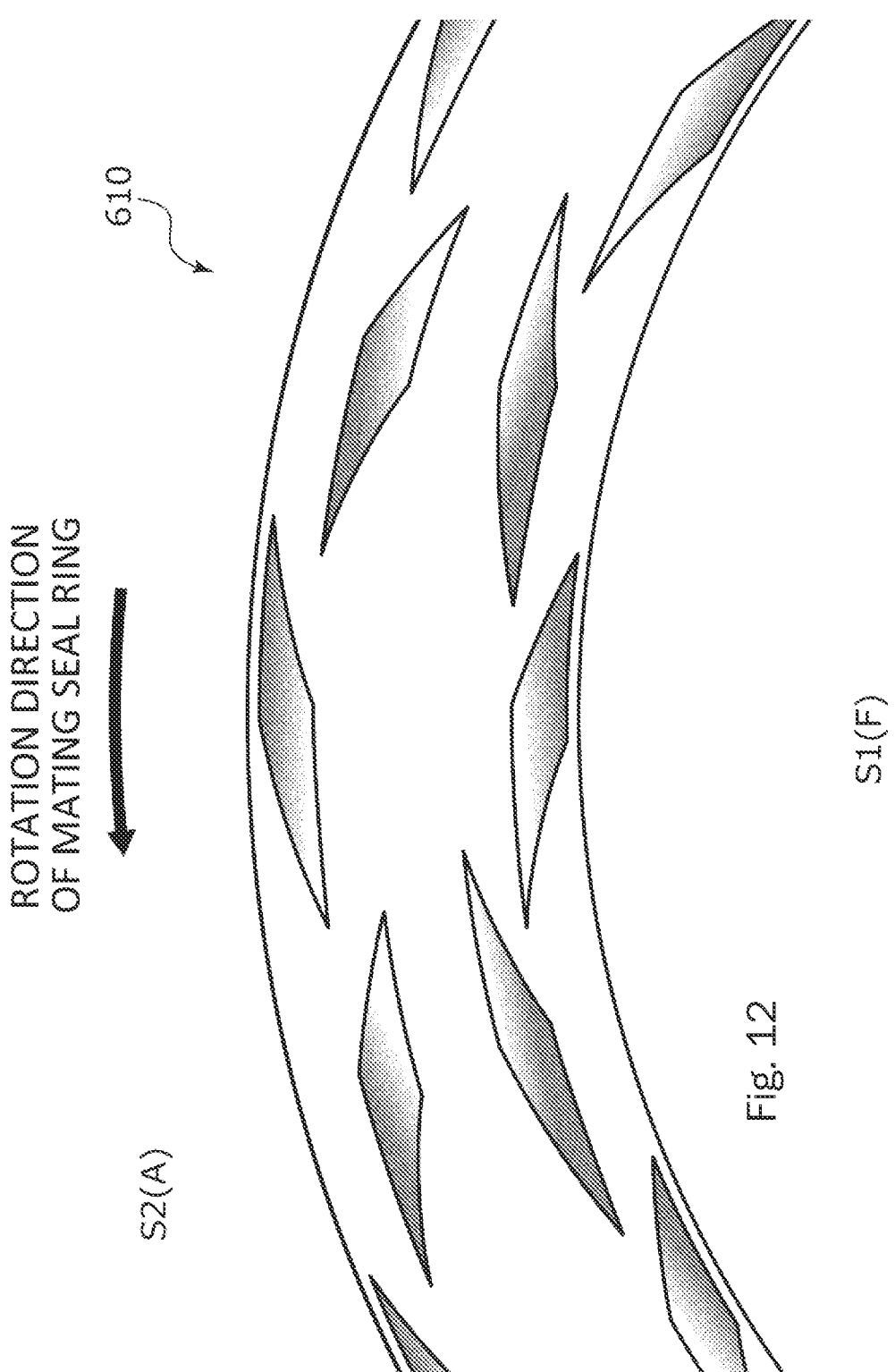
FIG. 12 is an enlarged view of a sliding surface of a stationary seal ring in a first modification example of the embodiments of the present invention when viewed in the axial direction.

In addition, in the first to fifth embodiments, as in a stationary seal ring 610 of a first modification example illustrated in FIG. 12, the first dynamic pressure generation grooves and the second dynamic pressure generation grooves may be displaced to be offset from each other in the circumferential direction. Incidentally, end portions may be partially connected in a state where the first dynamic pressure generation grooves and the second dynamic pressure generation grooves are offset from each other in the circumferential direction.

Figure 13:
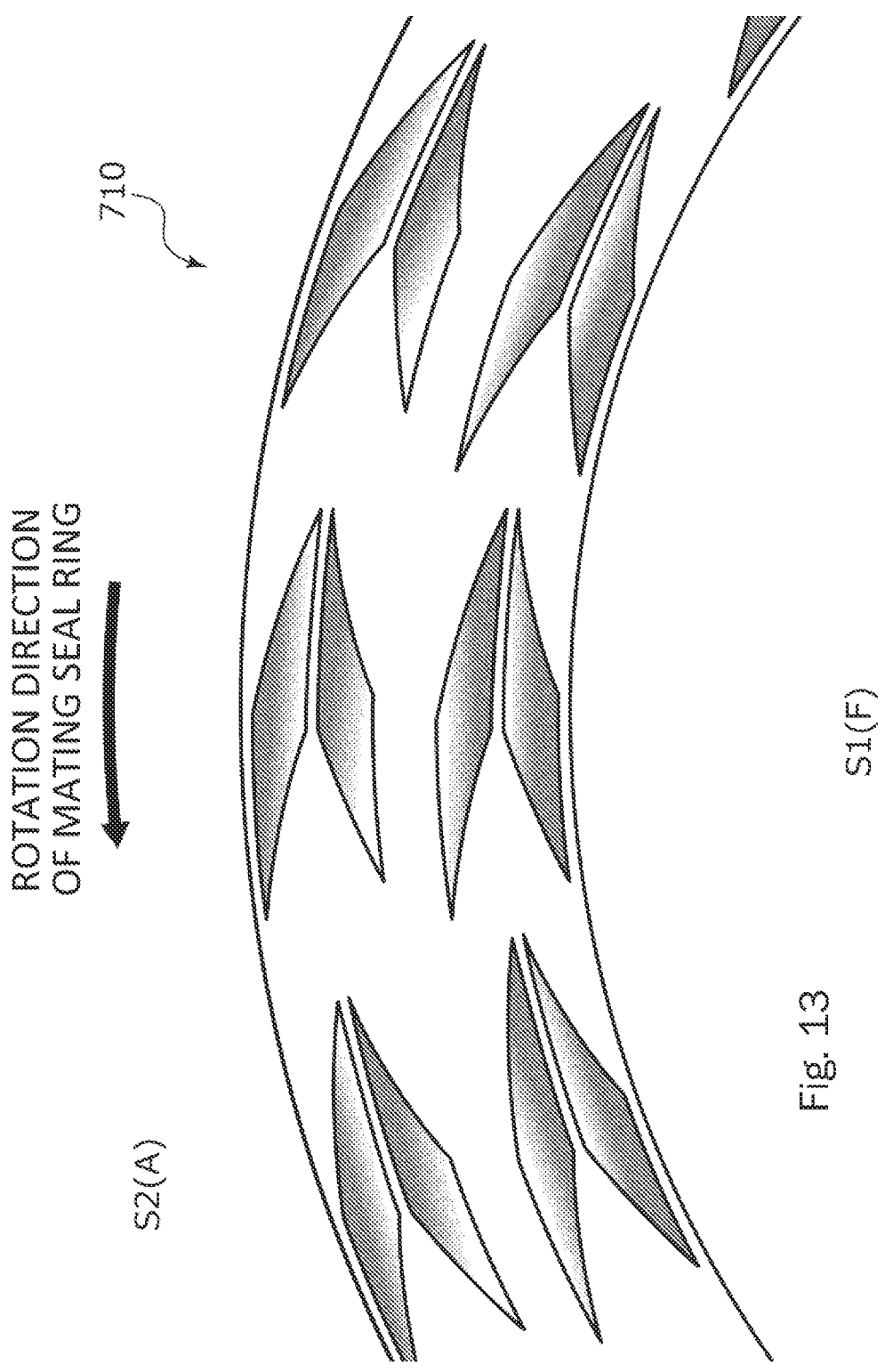
FIG. 13 is an enlarged view of a sliding surface of a stationary seal ring in a second modification example of the embodiments of the present invention when viewed in the axial direction.

In addition, in the first to fifth embodiments, as in a stationary seal ring 710 of a second modification example illustrated in FIG. 13, the inclinations of the first dynamic pressure generation groove and the second dynamic pressure generation groove with respect to the relative rotation direction (circumferential direction) may be formed in opposite directions.

Figure 14:
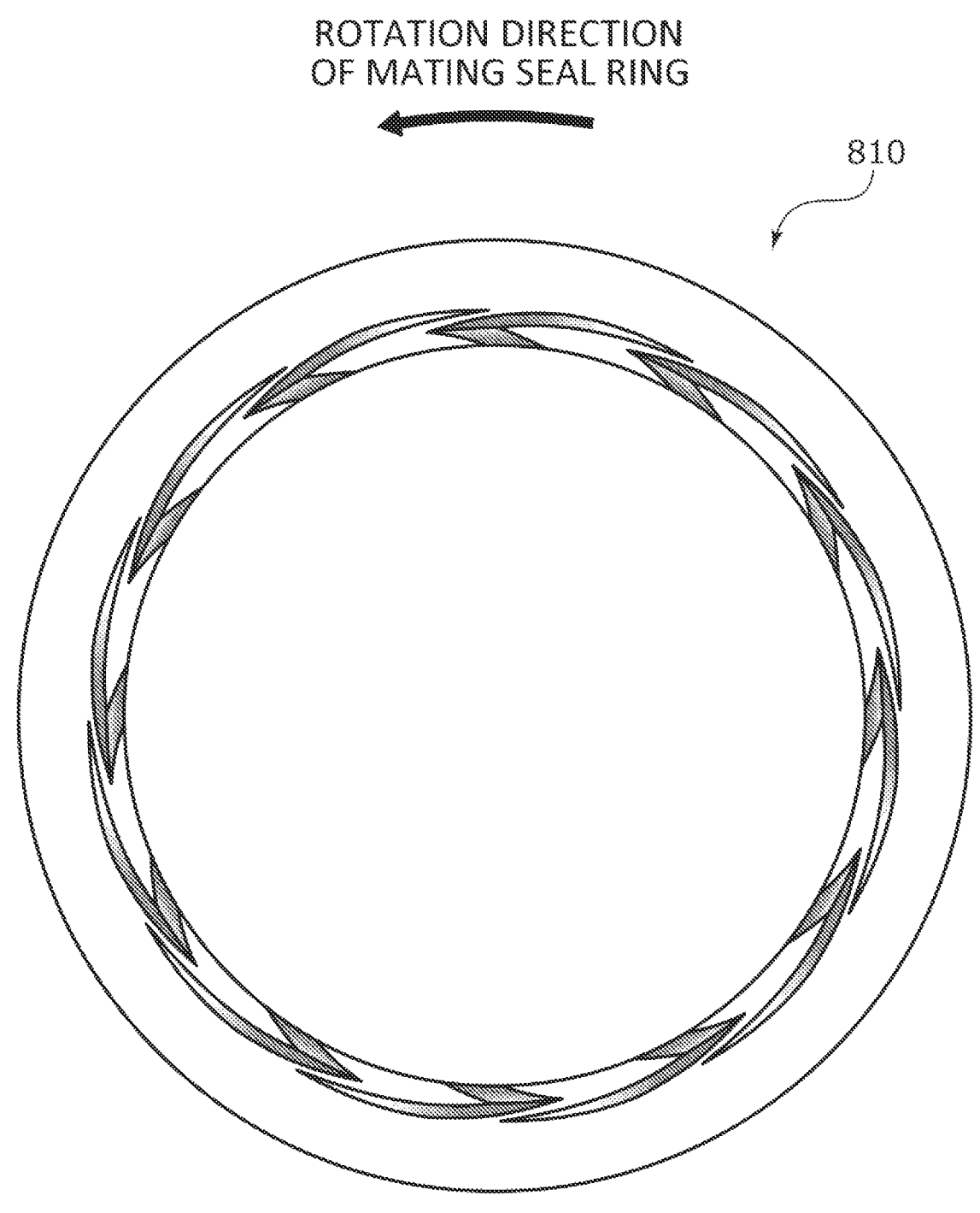
FIG. 14 is a view of a sliding surface of a stationary seal ring in a third modification example of the embodiments of the present invention when viewed in the axial direction.
Figure 15:
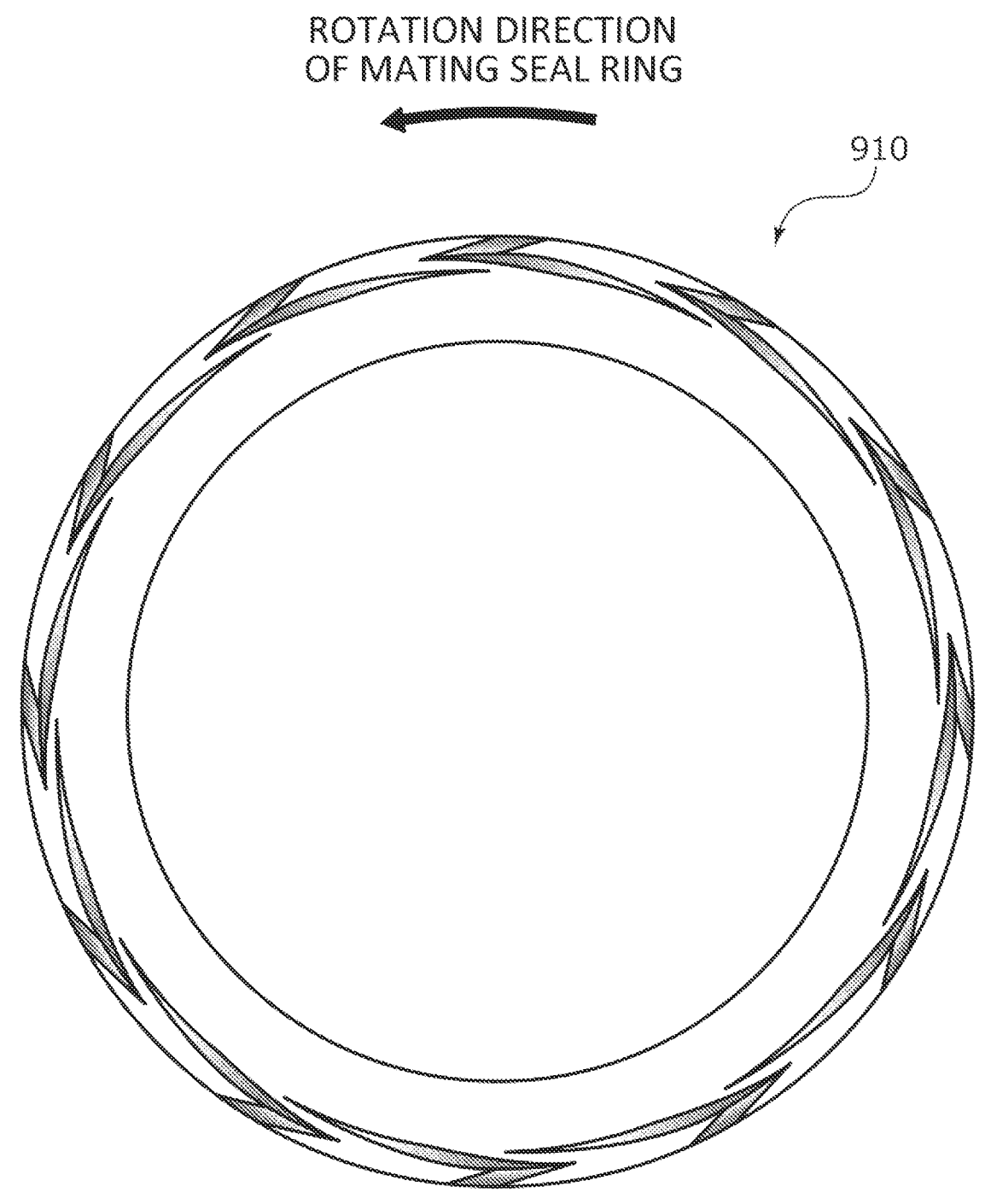
FIG. 15 is a view of a sliding surface of a stationary seal ring in a fourth modification example of the embodiments of the present invention when viewed in the axial direction.

In addition, in the first to fifth embodiments and the first and second modification examples, a mode in which the dynamic pressure generation mechanisms are formed on the radially inner side and the radially outer side of the sliding surface has been provided as an example; however, as in a stationary seal ring 810 of a third modification example illustrated in FIG. 14, the dynamic pressure generation mechanisms may be provided only on the radially inner side of the sliding surface, or as in a stationary seal ring 910 of a fourth modification example illustrated in FIG. 15, the dynamic pressure generation mechanisms may be formed only on the radially outer side of the sliding surface. In addition, three or more dynamic pressure generation mechanisms may be formed in the radial direction of the sliding surface.

In addition, in the first to fifth embodiments and the first to fourth modification examples, a mode in which the first dynamic pressure generation groove and the second dynamic pressure generation groove are disposed side by side in the radial direction has been provided as an example;

however, the first dynamic pressure generation groove and the second dynamic pressure generation groove may be disposed side by side in the circumferential direction.

REFERENCE SIGNS LIST

1 Rotating shaft
2 Sleeve
4 Housing
10 Stationary seal ring (sliding component)
11 Sliding surface
12 Land
13, 16 Dynamic pressure generation mechanism
14 First dynamic pressure generation groove
15 Second dynamic pressure generation groove
17 First dynamic pressure generation groove
18 Second dynamic pressure generation groove
20 Rotating seal ring (sliding component)
21 Sliding surface
A Atmosphere
F Sealed fluid
S1 Inner space (sealed fluid side space)
S2 Outer space (leakage side space)

The invention claimed is:

1. Sliding parts which are formed in an annular shape and disposed at a relative rotational location of a rotating machine, comprising a first sliding component having a first sliding surface and a second sliding component having a second sliding surface relatively slidable with the first sliding surface, the first sliding surface or the second sliding surface being provided with a first dynamic pressure generation groove extending so as to be inclined with respect to a relative rotation direction in a plan view, the first sliding surface or the second sliding surface being provided with a second dynamic pressure generation groove extending so as to be inclined in a direction opposite to an inclination direction of the first dynamic pressure generation groove with respect to the relative rotation direction in the plan view, wherein one of an outer diameter side and an inner diameter side of the sliding parts is a first radial side, and remaining one of the outer diameter side and the inner diameter side of the sliding parts is a second radial side, wherein the first dynamic pressure generation groove has a bottom surface which becomes shallower from the first radial side toward the second radial side throughout all the bottom surface of the first dynamic pressure generation groove, wherein the second dynamic pressure generation groove has a bottom surface which becomes shallower from the first radial side toward the second radial side throughout all the bottom surface of the second dynamic pressure generation groove, wherein the first dynamic pressure generation groove and the second dynamic pressure generation groove are disposed to be shifted from each other in a radial direction, wherein the first dynamic pressure generation groove has a deep groove portion on an upstream side of the relative rotation direction and a shallow groove portion on a downstream side of the relative rotation direction, and wherein the second dynamic pressure generation groove has a shallow groove portion on the upstream side of the relative rotation direction and a deep groove portion on the downstream side of the relative rotation direction.

2. The sliding parts according to claim 1,
wherein an end portion on the first radial side of the first dynamic pressure generation groove is configured to communicate with the first radial side as a sealed fluid side space or a leakage side space.

3. The sliding parts according to claim 2,
wherein the second dynamic pressure generation groove is a closed groove, and a length of the second dynamic pressure generation groove in an inclination direction of the second dynamic pressure generation groove is longer than a length of the first dynamic pressure generation groove in an inclination direction of the first dynamic pressure generation groove.

4. The sliding parts according to claim 1,
wherein the first dynamic pressure generation groove and the second dynamic pressure generation groove are configured to communicate with each other.

5. The sliding parts according to claim 1,
wherein the first dynamic pressure generation groove and the second dynamic pressure generation groove are disposed side by side in the radial direction.

6. The sliding parts according to claim 1,
wherein both the first dynamic pressure generation groove and the second dynamic pressure generation groove are provided on one of the first sliding surface and the second sliding surface.

7. The sliding parts according to claim 2,
wherein the first dynamic pressure generation groove and the second dynamic pressure generation groove are configured to communicate with each other.

8. The sliding parts according to claim 2,
wherein the first dynamic pressure generation groove and the second dynamic pressure generation groove are disposed side by side in the radial direction.

9. The sliding parts according to claim 3,
wherein the first dynamic pressure generation groove and the second dynamic pressure generation groove are configured to communicate with each other.

10. The sliding parts according to claim 3,
wherein the first dynamic pressure generation groove and the second dynamic pressure generation groove are disposed side by side in the radial direction.

11. Sliding parts which are formed in an annular shape and disposed at a relative rotational location of a rotating machine, comprising a first sliding component having a first sliding surface and a second sliding component having a second sliding surface relatively slidable with the first sliding surface, the first sliding surface or the second sliding surface being provided with a first dynamic pressure generation groove extending so as to be inclined with respect to a relative rotation direction in a plan view, the first sliding surface or the second sliding surface being provided with a second dynamic pressure generation groove extending so as to be inclined in a direction opposite to an inclination direction of the first dynamic pressure generation groove with respect to the relative rotation direction in the plan view,
wherein one of an outer diameter side and an inner diameter side of the sliding parts is a first radial side, and remaining one of the outer diameter side and the inner diameter side of the sliding parts is a second radial side,
wherein the first dynamic pressure generation groove has a bottom surface which becomes shallower from the first radial side toward the second radial side throughout all the bottom surface of the first dynamic pressure generation groove,
wherein the second dynamic pressure generation groove has a bottom surface which becomes shallower from the first radial side toward the second radial side throughout all the bottom surface of the second dynamic pressure generation groove,
wherein the first dynamic pressure generation groove and the second dynamic pressure generation groove are disposed to be shifted from each other in a radial direction,
wherein the first dynamic pressure generation groove has a shallow groove portion on an upstream side of the relative rotation direction and a deep groove portion on a downstream side of the relative rotation direction, and
wherein the second dynamic pressure generation groove has a deep groove portion on the upstream side of the relative rotation direction and a shallow groove portion on the downstream side of the relative rotation direction.

12. The sliding parts according to claim 11,
wherein an end portion on the first radial side of the first dynamic pressure generation groove is configured to communicate with the first radial side as a sealed fluid side space or a leakage side space.

13. The sliding parts according to claim 12,
wherein the second dynamic pressure generation groove is a closed groove, and a length of the second dynamic pressure generation groove in an inclination direction of the second dynamic pressure generation groove is longer than a length of the first dynamic pressure generation groove in an inclination direction of the first dynamic pressure generation groove.

14. The sliding parts according to claim 11,
wherein the first dynamic pressure generation groove and the second dynamic pressure generation groove are configured to communicate with each other.

15. The sliding parts according to claim 11,
wherein the first dynamic pressure generation groove and the second dynamic pressure generation groove are disposed side by side in the radial direction.

16. The sliding parts according to claim 11,
wherein both the first dynamic pressure generation groove and the second dynamic pressure generation groove are provided on one of the first sliding surface and the second sliding surface.

* * * * *